United States Patent [19]

Luten et al.

[11] 3,875,388

[45] Apr. 1, 1975

[54] MODULAR SYSTEM FOR EVALUATING SAILBOAT PERFORMANCE

[75] Inventors: Robert H. Luten, Los Gatos; Lucian W. Taylor, Los Altos, both of Calif.

[73] Assignee: Velcon Filters, Inc., San Jose, Calif.

[22] Filed: Nov. 5, 1973

[21] Appl. No.: 412,593

[52] U.S. Cl. .......................... 235/150.2, 235/151.32

[51] Int. Cl. .......................... G06g 7/78

[58] Field of Search ...........235/152, 156, 164, 150.2, 235/150.27, 150.3, 154, 155, 235/151.32; 340/172.5

[56] References Cited

UNITED STATES PATENTS

| | | | |
|---|---|---|---|
| 3,012,230 | 12/1961 | Galas et al. | 340/172.5 |
| 3,678,474 | 7/1972 | Brown | 235/150.2 |
| 3,764,784 | 10/1973 | Haner et al. | 235/150.3 |
| 3,780,272 | 12/1973 | Rohner | 235/150.2 |
| 3,800,128 | 3/1974 | Kurk | 235/150.2 |

*Primary Examiner*—Felix D. Gruber
*Attorney, Agent, or Firm*—David H. Wilson

[57] ABSTRACT

A system for evaluating sailboat performance wherein boat speed, apparent wind speed and apparent wind direction are sensed and utilized to determine the performance characteristics of sailing boats. Modular signal detection and signal display units are bus-tied to a computer which controls data flow on the bus and computes average boat speed, average apparent wind speed and average apparent wind direction for display. Storage of the sailboat's previous performance also permits computation of a comparison between its present performance and its previous best.

61 Claims, 9 Drawing Figures

FIG. 1

MODULAR SYSTEM FOR EVALUATING SAILBOAT PERFORMANCE

RELATED APPLICATION

This invention relates to a further improvement and development of a system for determining the performance characteristics of a sailboat as disclosed in the patent application of Lucian W. Taylor and George J. Eilers, entitled "System for Evaluating Sailboat Performance," Ser. No. 347,380 filed Apr. 3, 1973 and the patent application of Lucian W. Taylor and John M. Yarborough, Jr., entitled "Signal Averaging Circuit," Ser. No. 376,709 filed July 5, 1973.

FIELD OF THE INVENTION

This invention relates to a system for automatically determining performance characteristics of a sailing boat. Modular signal detectors ascertain instantaneous values of boat speed, apparent wind speed and apparent wind direction which are utilized to generate average bat speed, average apparent wind speed and average apparent wind direction. These average signals are transmitted to modular signal displays to enable a sailor to most efficiently sail the both at the maximum hull speed under continuously varying conditions.

DESCRIPTION OF THE PRIOR ART

Since many sailing enthusiasts are interested in determining that their sailboats are performing as close to the designed "hull speed" as possible, attempts have been made toward evaluating the performance of a sailboat. It is well understood that sail designs, full design, sea conditions, and wind conditions cooperate to regulate the speed of a sailboat. However, much of this basic information has never been properly checked from an empirical standpoint because there have been no systems employing really meaningful metering equipment. Since the inertia of a sailboat is high, the boat responds to an average wind speed and direction at an average boat speed over any period of time. Readings from instruments which provide instantaneous values of speed produce erroneous calculations of boat performance since an instantaneous value may vary significantly from an average value. Damped instruments are able to provide an average value over a short period of time but are confined to a single value of averaging period.

The system disclosed in U.S. Pat. application Ser. No. 347,380 entitled "System For Evaluating Sailboat Performance" by Lucian W. Taylor and George J. Eilers and the circuits disclosed in U.S. Pat. application Ser. No. 376,709 entitled "Signal Averaging Circuit" by Lucian W. Taylor and John M. Yarborough, Jr. produce average boat speed, apparent wind speed and apparent wind direction signals for an accurate evaluation of the performance of a sailboat.

SUMMARY OF THE INVENTION

It is an object of the present invention to produce a system for evaluating the performance of a sailboat capable of ascertaining average boat speed, average apparent wind speed and average apparent wind direction.

Another object of the invention is to produce a system for evaluating the performance of a sailboat wherein means are provided to automatically sense average boat speed, average apparent wind speed and average apparent wind direction either individually or in combination.

Still another object of the invention is to produce a system for evaluating the performance of a sailboat wherein the average boat speed average wind speed and average apparent wind direction may be selectively presented in a sequential manner.

A further object of the invention is to produce a system for evaluating the performance of a sailboat whereby the capability of the system may be readily expanded by the addition of modular signal detectors and modular signal displays.

Another object of the invention is to produce a system for evaluating the performance of a sailboat wherein the present performance characteristics are compared to the previous best performance of the boat.

Still another object of the invention is to produce a system for evaluating the performance of a sailboat whereby the system performs the function of an autopilot.

Another object of the invention is to produce a system for evaluating the performance to a sailboat whereby the system performs the function of a dead reckoning navigation computer.

A further object of the invention is to produce a system for evaluating the performance of a sailboat which may be readily and economically installed as auxiliary equipment on existing boats or may be incorporated as an integral portion of sailboats during construction.

DESCRIPTION OF THE PREFERRED EMBODIMENT

Figure 1:
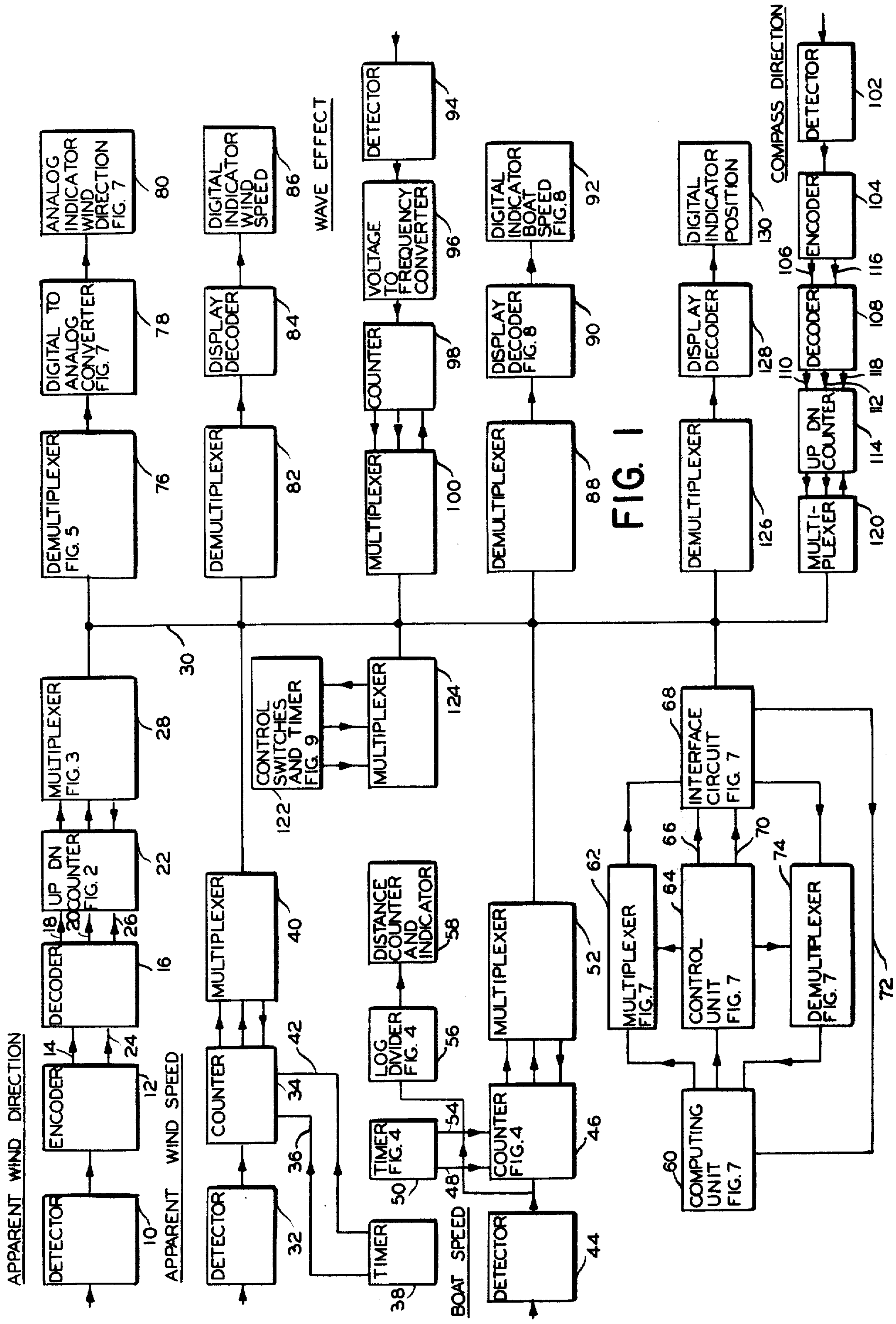
FIG. 1 is a functional block diagram of a modular system for evaluating sailboat performance.

In sailboating, the accurate measurement of boat performance is important whether it is desired to sail from point X to point Y in the shortest possible time or simply to determine if a new piece of equipment has changed the speed of the boat. FIG. 1 is a functional block diagram of a modular system for evaluating sailboat performance. Modular signal detectors, modular signal displays and a computing unit are tied together by a common bus line over which data is transmitted between the computer and any other device. Each device has its own address code and when it is addressed by the computing unit it can be commanded to read data from or send data on the bus line in accordance with its prescribed function.

In FIG. 1, apparent wind direction, apparent wind speed, boat speed, wave effect and compass direction signals are detected and converted to binary coded decimal form. The computing unit is programmed to send address and control signals on the bus line which are received by all multiplexer and demultiplexer units. If data is being requested, only the multiplexer which is assigned the address present on the bus line will respond. This multiplexer will place binary coded decimal information onto the bus line where it may be read by the computing unit. The computing unit performs the necessary arithmetic operations on the data to generate a display signal and then places the display data and the proper demultiplexer address on the bus line. The addressed demultiplexer reads the data which is then converted to a form which activates a display device for the desired wind direction, wind speed, boat speed and course correction results.

From the reference point of a moving sailboat, there is created a wind past the boat in a direction opposite the boat heading. This wind is added vectorially to the true wind which is propelling the boat to produce an apparent wind direction and apparent wind speed. These apparent values are detected and displayed by conventional instruments but their usefulness is limited since someone must break them into their component vectors in order to determine the actual performance of the boat. In the present invention, this conversion along with other functions may be performed quickly and automatically by the computing unit. In FIG. 1, apparent wind direction is sensed by wind direction detector 10, which may be a conventional wind vane, which drives a dual-track, quadrature phased incremental shaft encoder 12. Encoder 12 produces an analog signal on data line 14 corresponding to the position of the wind vane of detector 10. This analog signal is converted by decoder 16 to a pulse train on up line 18, one pulse for each degree of clockwise rotation of detector 10, and a pulse train on down line 20, one pulse for each degree of counterclockwise rotation of dector 10. Binary coded decimal up/down counter 22 adds pulses on up line 18 and subtracts pulses on down line 20 to maintain a total count representative of the position of detector 10 in degrees or rotation. Encoder 12 also sends a signal on index line 24 at predetermined points, approximately 80°, 180° and 280°, to decoder 16 which generates a signal on index data line 26 to counter 22. This signal will corect any errors in the total count of counter 22 at the predetermined points. When multiplexer 28 is addressed the contents of counter 22 will be placed on bus line 30 to be read by the computing unit. Multiplexer 28 is utilized to convert the binary coded decimal data from parallel to serial form so that is may be transmitted on a single data line within bus line 30.

Apparent wind speed and boat speed signals are converted to binary coded decimal by circuits which are similar. Apparent wind speed is sensed by detector 32, which may be a masthead anemometer and pulse generator, which gnerates a pulse train with frequency proportional to speed. Counter 34 counts the pulses for a period to time determined by an enable signal on line 36 from timer 38 so that the total count represents apparent wind speed. When multiplexer 40 is addressed to contents of counter 34 will be placed on bus line 30 to be read by the computing unit. After this data transfer, timer 38 sends a reset signal on line 42 to reset counter 34 to binary zero and then sends an enable signal on line 36 to commence another counting sequence. Boat speed is sensed by detector 44, which may be a magnetic paddlewheel, which generates a pulse train with frequency proportional to speed. Counter 46 counts the pulses for a period of time determined by an enable signal on line 48 from timer 50. when multiplexer 52 is addressed the contents of counter 46 will be placed on bus line 30 to be read by the computing unit. After this data transfer, timer 50 sends a reset signal on line 54 to reset counter 46 to binary zero and then send an enable signal on line 48 to commence another counting sequence. The pulse train output of boat speed detector 44 is also utilized to produce a log counter signal. Log divider 56 divides the frequency of the boat speed pulse train by a predetermined factor to produce a pulse train representing nautical miles traveled. Distance counter and indicator 58 counts this pulse train and displays the total count as distance traveled.

Computing unit 60 has a program stored in a read only memory which controls the transmission of signals on bus line 30. If, for example, the program requires apparent wind direction data the address and control signals for multiplexer 28 must be sent to enable multiplexer 288 to place the data on the bus line. An instruction in the program will generate the correct six bit multiplexer address which is converted form parallel to serial form by multiplexer 62. Computing unit 60 also enables control unit 64 to generate a strobe signal on line 66 for each address bit and both signals are passed through interface circuit 68 and onto bus line 30. Each multiplexer connected to bus line 30 receives the strobe and address signals but only multiplexer 28 will respond to its address. When the six address bits have been received and decoded computing unit 60 enables control unit 64 to generate a mode signal on line 70 through interface circuit 68. This mode signal and the address signals request multiplexer 28 to check whether the data is ready for transmission. If the data is available a data ready signal is sent on bus line 30 through interface circuit 68 to computing unit 60 on test line 72. This test signal tells computing unit 60 to enable control unit 64 to send a series of strobe signals on line 66 through interface circuit 68 onto bus line 30. Multiplexer 28 responds to each strobe signal by placing a data bit on bus line 30 where the serial bits are the multiplexed binary coded decimal representation of apparent wind direction. The data bits are decoded by demultiplexer 74 and ready by computing unit 60. Now computing unit 60 will execute the program instructions to perform the arithmetic operations necessary to generate the data for the displays.

When the computer program reaches the point at which data is to be transmitted to a display, the display address is converted from parallel to serial form by multiplexer 62. Computing unit 60 enables control unit 64 to generate a strobe signal on line 66 for each address bit and both signals are passed through interface circuit 68 and onto bus line 30. Each demultiplexer connected to bus line 30 receives the strobe and address signals but only one demultiplexer, for example wind direction demultiplexer 76, will respond to the address. When the six address bits have been received computing unit 60 enables control unit 64 to generate a mode signal on line 70 through interface circuit 68. This mode signal enables demultiplexer 76 to receive the data bits and strobe signals from multiplexer 62 and control unit 64 which are generated next. The binary coded decimal data signals are converted to an analog signal by converter 78 to drive an analog wind direction indicator 80. Where wind speed and boat speed are to be displayed, the indicators may be of the digital type requiring only decoding of the binary coded decimal signal from the computing unit. Demultiplexer 82 converts the data from serial to parallel form which is then decoded by display decoder 84 and displayed on digital indicator 86 as wind speed. Boat speed data is converted from serial to parallel form by demultiplexer 88 and is then decoded by display decoder 90 and displayed on digital indicator 92.

In the basic system the wind direction, wind speed and boat speed signals may be totaled in computing unit 60 over predetermined periods of time to produce average signals. The average apparent wind direction at indicator 80 and the average apparent wind speed at indicator 86 represent the factors which are producing the average boat speed at indicator 92. By comparing these values with charts of previously recorded values the present performance of the sailboat may be determined. Since true wind direction and true wind speed must be calculated from apparent wind direction, apparent wind speed and boat speed in order to determine the best course to sail, further programming will allow computing unit 60 to perform the calculations and display true wind direction at indicator 80 and true wind speed at indicator 86. If data is compiled by utilizing the present invention under various conditions, the performance characteristics of the boat can be placed in the memory of computing unit 60. The computing unit then can compare the present boat speed with the previous best boat speed under the same conditions of wind direction and speed to permit a display at boat speed indicator 92 of whether the boat is slower or faster. This would be especially helpful in testing new equipment.

Wave size and frequency also affects boat performance therefore, a wave effect detector 94, which may be an accelerometer, might be utilized. The analog signal from detector 94 is converted from voltage to a frequency based pulse train by converter 96 and totaled in counter 98. The count total is then converted from parallel to serial form by multiplexer 100. In the table of previous performance boat speed would be stored with reference to wind direction, wind speed and wave effect.

A further expansion of the system may be accomplished by adding a compass direction detector 102. Encoder 104 is a dual-track, quadrature phased incremental shaft encoder which is driven by detector 102 and produces an analog signal on line 106 corresponding to compass direction. Decoder 108 converts this analog signal to a pulse train on up line 110, one pulse for each degree of clockwise rotation and a pulse train on down line 112, one pulse for each degree of counterclockwise rotation. Binary coded decimal up/down counter 114 adds the pulses on up line 110 and subtracts the pulses on down line 112 to maintain a total count representative of the position of detector 102. Encoder 104 also sends a signal on index line 116 at predetermined compass points to decoder 108 which generates a signal on index data line 118 to counter 114 to correct any errors in the total count at these points. Multiplexer 120 converts the parallel binary coded decimal data to serial form for transmission on bus line 30. Control switches 122 and multiplexer 124 may be utilized to send a desired compass heading to computing unit 60 which then can compare the desired heading with the actual heading as received from detector 102 and produce an error signal. The error signal, through a demultiplexer and associated circuitry, may be utilized to automatically correct the boat heating thereby functioning as an autopilot. Computing unit 60 may also resolve the east-west and north-south components of boat speed and integrate them to function as a dead reckoning computer. Position coordinates would be converted from serial to parallel binary coded decimal by demultiplexer 126 and decoded by display decoder 128 to generate a numerical display of position at digital indicator 130. Control switches and timer 122 may also be utilized to change averaging times for apparent wind direction, apparent wind speed and boat speed, to change the frequency of display of any of the signals or to select functions only as required.

The present invention relies upon the transmission of multiplexed data along a common bus line between modular signal sensors or modular signal displays and a computing unit. Each input signal is converted to binary coded decimal and then multiplexed by converting from parallel to serial form before transmission to the computing unit. At the computing unit the data is demultiplexed and utilized to generate new data for display. This new data is then multiplexed and sent to a display unit where it is demultiplexed to drive an indicator. Each multiplexer and demultiplexer has a unique address which must be received from the computing unit before data may be sent or received. Therefore, the number of sensors and displays incorporated in the system is only limited by the number of addresses available and the capacity of the computing unit. The basic system for sensing and displaying wind direction, wind speed and boat speed may be easily expanded by adding other sensing and display modules as more functions are desired.

Figure 2:
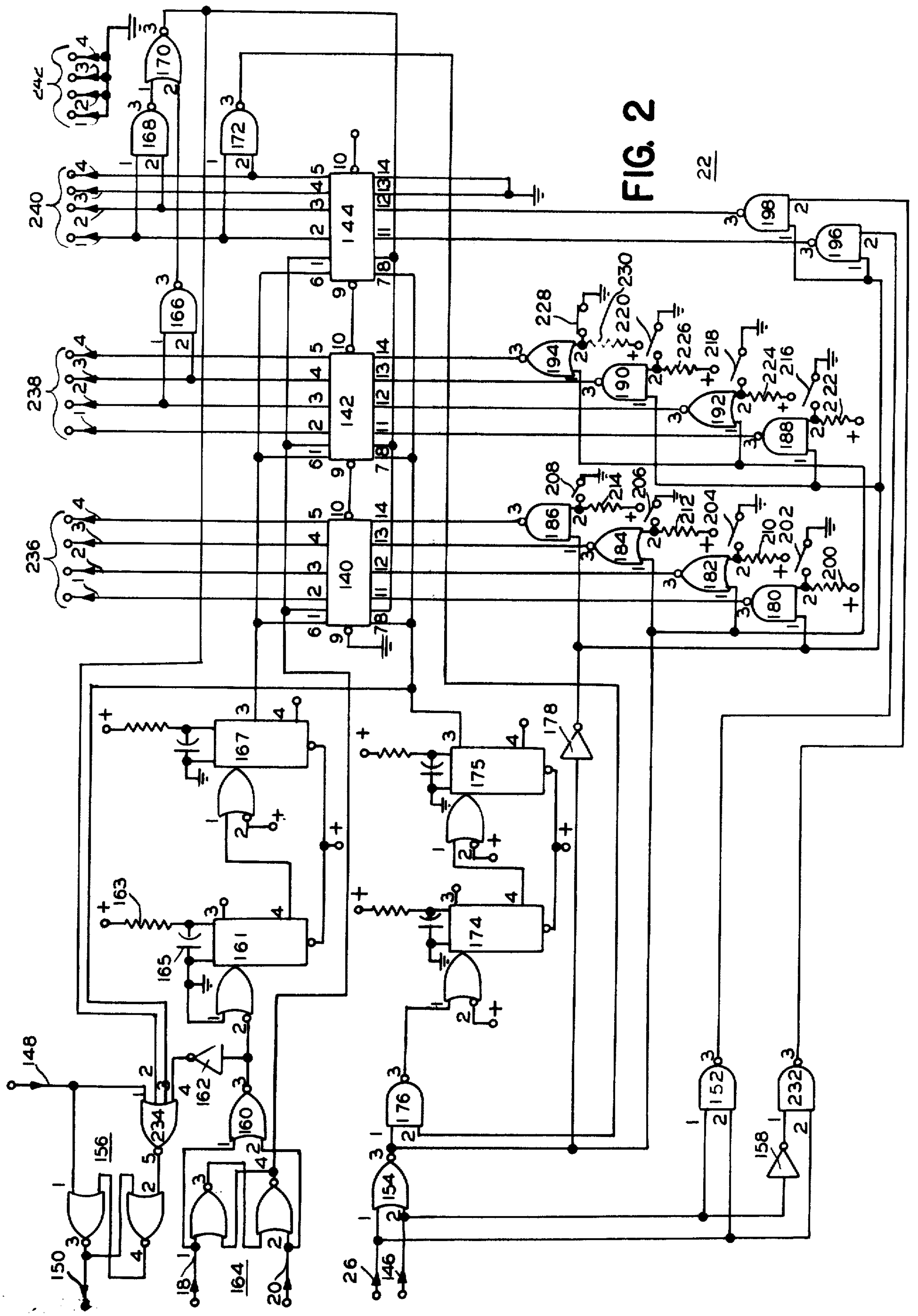
FIG. 2 is a schematic representation of the wind direction counter of FIG. 1.

FIG. 2 is a schematic representation of wind direction counter 22 of FIG. 1. Decoder 16 sends up counts on line 18 and down counts on line 20 which are totaled in counters 140, 142 and 144. Index data lines 26 and 146 provide a correction signal to the counters at predetermined points of compass rotation to correct any errors in the count total. When the wind direction count is to be read a device select signal is received on line 148 from multiplexer 28 of FIG. 1 after that multiplexer has been addressed by computing unit 60. In response, wind direction counter 22 will send a data ready signal on line 150 in the absence of up and down counts or a correction or clear signal on line 150 in the absence of up and down counts or a correction or clear signal at counters 140, 142 and 144.

In the following discussion logic level one will be represented as 1 and 0 will represent logic level zero. Each logic element will be designated by a number and each terminal will be indicated as terminal "152-1" which is an input terminal for NAND element 152 which produces a 0 at output 152-3 when both inputs are at 1 and a 1 at output 152-3 for any other combination of input signals. Element 154 is a NOR which produces a 1 at output 154-3 when inputs 154-1 and 154-2 are at 0 and a 0 at output 154-3 for any other combination of input signals.

Element 156 is a NOR flip flop comprised of two cross-coupled NOR elements. When inputs 156-1 and 156-2 ae at 1 outputs 156-3 and 156-4 will be at 0. If input 156-1 changes to a 0 output 156-3 changes to 1. If instead input 156-2 changes to 0 output 156-4 changes to 1. When both inputs are at 0 outputs 156-3 and 156-4 will be in the state generated by the first input to change to 0. Element 140 is a binary coded decimal up/down counter. A 1 at up/down count input 140-1 will add to and a 0 will subtract from the total binary count as displayed at outputs 140-2, 140-3, 140-4 and 140-5 where output 140-2 is binary one, output 140-3 is binary two, output 140-4 is binary four and output 140-5 is binary eight. Each input signal must be accompanied by a change from 0 to 1 at clock input 140-6, a 0 at preset enable input 140-7, a 0 at reset input 140-8 and a 0 at carry input 140-9 in order to change the output signals. When the outputs reach a total count of binary nine an up count will set all outputs to 0, representing binary zero, and a carry out signal is issued as a change from 1 to 0 at output 140-10 to enable the next counter in series to count. When the outputs are at binary zero a down count will set the outputs to binary nine and carry output 140-10 will also change from 1 to 0 to enable the next counter in series to count. A 1 at reset input 140-8 will set all outputs to 0 and a 1 at preset enable input 140-7 will cause the signals present at preset inputs 140-11, 140-12, 140-13 and 140-14 to be transferred to outputs 140-2, 140-3, 140-4 and 140-5 respectively. By connecting the carry output 140-10 to the carry input of a second counter the two counters will count in series with the first counter representing the one's position and the second counter the ten's position of a decimal number. The addition of a third counter expands the number with a hundred's position. Element 158 is an inverter which changes a 1 to a 0 and a 0 to a 1.

During clockwise rotation of wind direction detector 10 of FIG. 1, a 1 will appear on up line 18 for each degree of rotation. Counter 140 will count to binary nine at outputs 140-2 through 140-5 and generate a 0 at carry output 140-10. Counter 142 receives the carry 0 at carry input 140-9 and the next count will produce a binary one representing decimal ten or 10° of clockwise rotation while the outputs of counter 140 are changed to zero. When both counters 140 and 142 are at binary nine, decimal 99, an up count at input 140-1 will change counter 140 outputs to zero and the 0 carry signal to counter 142 will allow counter 142 to have its outputs set to binary zero. The 0 carry signal at outut 142-10 to input 144-9 allows counter 144 to be set to binary one. The output of counters 140, 142 and 144 will then represent decimal 100 or 100 degrees of clockwise rotation. During counterclockwise rotation a 1 will appear on down line 20 for each degree of rotation and will cause counter 140 to subtract to binary one from the binary number at outputs 140-2 through 140-5. When counter 140 reaches binary zero the next down count will change the output to binary nine and counter 142 then subtracts a binary one from its output. When both counters 140 and 142 are at binary zero the next count would be subtracted from the output of counter 144. Therefore, counter 140, 142 and 144 produce the three digits of a decimal number representing degrees of rotation with each digit in binary form.

If there are no pulse counts on lines 18 and 20 inputs 160-1 and 160-2 are both at 0 and output 160-3 produces at 1 at input 161-2 of monostable multivibrator 161. If input 161-1 changes from 0 to 1 while input 161-2 is at 1 or input 161-2 changes from 1 to 0 while input 161-1 is at 0, output 161-3 will produce a 1 pulse and output 161-4 will produce a 0 pulse the duration of which is determined by external timing components, resistor 163 and capacitor 165. Multivibrator 167 will respond to the change of output 161-4 from 0 to 1 at the end of the pulse to produce a 1 pulse of a duration determined by its external timing components. since input 161-1 receives a 0 from ground and input 161-2 receives a 1 from output 160-3 output 167-3 of multivibrator 165 will be at 0. A 1 pulse on either input line will change output 160-3 to 0 and produce a 1 at clock inputs 140-6, 142-6 and 144-6. If the 1 appears on up line 18 at input 164-1 of NOR flip flop 164 output 164-4 will be at 1 to produce an up count at inputs 140-1, 142-1 and 144-1. If the 1 appears on down line 20 at input 164-2 output 164-4 will be at 0 to produce a down count at inputs 140-1, 142-1 and 144-1. Therefore, a 1 count pulse on either line produces its own clock pulse to counters 140, 142 and 144. Multivibrators 161 and 167 provide an approximately 2 microsecond delay for the clock pulses relative to the up or down count signal from NOR flip flop 164 to prevent a count from being registered before the count direction has changed.

Since the capacity of the three counters is decimal 999, provision must be made to reset to zero degrees after 359° has been reached during clockwise rotation and to reset to 359° after zero degrees has been reached during counterclockwise rotation. Output 142-3 represents binary two and output 142-4 represents binary four to produce a 1 at inputs 166-1 and 166-2 of NAND 166 each time counter 142 reaches 60 degrees to change to output from 1 to 0. Output 144-2 represents binary one and output 144-3 represents binary two to produce a 1 at inputs 168-1 and 168-2 of NAND 168 each time counter 144 reaches 300° to change output 168-3 from 1 to 0. Therefore, only when 360° have been counted will inputs 170-1 and 170-2 of NOR 170 both be at 0 to change output 170-3 from 0 to 1. The 1 from NOR 170 resets the counters at reset inputs 140-8, 142-8 and 144-8 to binary zero to represent zero degrees and subsequent counting begins at this point.

In order to count down from zero degrees to 359° during counterclockwise rotation the counters must be loaded with the binary equivalent signals. At zero degrees all counter outputs are at binary zero. A 0 on down line 20 will set each counter to binary nine and produce a 0 carry signal from carry output 144-10. Inputs 172-1 and 172-2 of NAND 172 will change from 0 to 1 to produce a change at output 172-3 from 1 to 0 which is present at input 176-2 of NAND 176. Since the detector is not at one of the index points index data lines 26 and 146 are at 0 to produce a 1 from output 154-3 of NOR 154 to input 176-1. When input 176-2 changes from 1 to 0 output 176-3 will change from 0 to 1 at input 174-1 of monostable multivibrator 174. Multivibrator 174 will produce a 0 pulse, the duration of which is determined by external timing components, from output 174-4 at input 175-1 of multivibrator 175.

At the termination of the 0 pulse from output 174-4 multivibrator 175 will respond to the change from 0 to 1 by producing a 1 pulse at output 175-3 the duration of which is determined by the external timing components connected to it. Multivibrators 174 and 175 provide an approximately two microsecond delay for the present enable signal at preset inputs 140-7, 142-7 and 144-7 relative to the input signals at the preset inputs. The 1 from output 154-3 is changed to a 0 by inverter 178 at input 180-1 of NAND 180 to produce a 1 from output 180-3 to input 140-11 which places a binary one at output 140-2. The 1 from output 154-3 is present at inputs 182-1 and 184-1 of NOR's 182 and 184. Outputs 182-3 and 184-3 will be at 0 which is placed at outputs 140-3 and 140-4. The 1 from inverter 178 is also present at input 186-1 to produce a 1 from output 186-3 which is placed at output 140-5 to represent binary eight. Therefore, counter 140 has been loaded to binary nine or 9°.

Inputs 188-1 and 190-1 of NAND's 188 and 190 receive the 0 from inverter 178 to place a 1 at outputs 144-2 and 144-4 of counter 144. Inputs 192-1 and 194-1 of NOR's 192 and 194 receive the 1 from output 154-3 to place a 0 at outputs 144-3 and 144-5. Thus, counter 144 has been loaded to binary five or 50°. The 0 from inverter 178 is also present at inputs 196-1 and 198-1 of NAND's 196 and 198 to place a 1 at outputs 144-2 and 144-3. Inputs 144-3 and 144-14 are connected to ground to provide a 0 to outputs 144-4 and 144-5. Therefore, counter 114 has been loaded to binary three or 300° to produce a total binary count of 359° at which point subsequent counting begins.

Encoder 12 of FIG. 1 is provided with three index positions which generate index signals on line 24 through decoder 16 to index data lines 26 and 146. These index signals are utilized to correct the count totals in counters 140, 142 and 144 at three predetermined points during the rotation of the detector. Since the encoder index positions may vary due to installation tolerances, a pair of binary coded decimal switches may be preset to provide a binary number between 00 and 99 to counters 140 and 142. This number when combined with a binary number from zero to three from NAND's 196 and 198 enables counters 140, 142 and 144 to be corrected at three positions between 00 and 359°. Once the binary switches have been preset the one's and ten's digits of the three index positions will remain the same and the positions will be spaced at intervals of multiples of 100°. Therefore, if it is desired to space the first and third positions equally from zero degrees the three index positions will be at 80, 180 and 280°.

A 1 index signal on one of index data lines 26 or 146 will change output 154-3 of NOR 154 from 1 to 0 at input 176-1 of NAND 176 to produce a 1 from output 176-3 at input 174-1 of multivibrator 174. After an approximately 2 microsecond delay multivibrator 175 produces a 1 at preset enable inputs 140-7, 142-7 and 148-7. The 0 from output 154-3 is present at NOR's 182, 184, 192 and 194 to enable them. The 1 from inverter 178 is present at NAND's 180, 186, 188, 190, 196 and 198 to enable them. Input 180-2 of NAND 180 is connected to a positive power supply through resistor 200 to provide a 1 and produce a 0 from output 180-3 through input 140-11 to output 140-2 to represent the binary one place in the decimal one's position of the detector rotation in degrees. Switch section 202 of the first binary coded decimal switch is connected to ground to produce a 0 at input 180-2 when closed in order to generate a 1 at output 140-2. If the index position is 80°, switch sections 202, 204, 206 and 208 are open and resistors 200, 210, 212 and 214 provide a 1 to inputs 180-2, 182-2, 184-2 and 186-2 to produce a 0 at outputs 180-3, 182-3, 184-3 and 186-3 to load counter 140 to binary coded decimal zero. Switch sections 216, 218 and 220 of the second binary coded decimal switch are also open and resistors 222, 224 and 226 provide a 1 to inputs 188-2, 192-2 and 190-2 while switch section 228 is closed to place a 0 at input 194-2 instead of a 1 from resistor 230 to load counter 142 to binary coded decimal 80.

At the first index position line 26 will receive a 0 while line 146 remains at 1. This 0 is present at inputs 152-2 and 232-2 of NAND's 152 and 232 to produce at 1 from outputs 152-3 and 232-3 at inputs 196-2 and 198-2 of NAND's 196 and 198. Since NAND's 196 and 198 are enabled by a 1 from inverter 178 outputs 196-3 and 198-3 will change from 1 to 0 to load counter 144 to zero from a correction of 080°. Next, at the second index position, both lines 26 and 146 will receive a 1 to produce a 0 from NAND 152 at input 196-2 to generate a 1 from output 196-3. The 1 on line 146 is changed to a 0 by inverter 158 at input 232-1 while input 232-2 is at 0 to produce a 1 at input 198-2 to generate a 0 from output 198-3 and load counter 144 to one for a correction of 180°. Finally, at the third index position, line 146 will receive a 0 while line 26 remains at 1. This 0 produces a 1 from NAND 152 at input 196-2 to generate a 0 from output 196-3. The 0 on line 146 is changed to a 1 at input 232-1 and with the 1 on line 26 produces a 0 at input 198-2 to generate a 1 from output 198-3 and load counter 144 to two for a correction of 280°. At each index position at least one of the inputs to NOR 154 was at 1 to produce a 0 which is changed to a 1 by inverter 178 to enable NAND's 196 and 198. The 2 microsecond delay produced by mutlivibrators 174 and 175 assures that the correct preset signals are generated at the preset inputs of the counters before the preset enable signal is applied.

In the absence of a device select signal on line 148, set input 156-1 of flip flop 156 and input 234-1 of NOR 234 receive a 1. The 1 at input 234-1 produces a 0 from output 234-5 at reset input 156-2 which generates a 0 at output 156-3 to indicate that the data is not ready on line 150. When computing unit 60 in FIG. 1 is ready to receive wind direction data a device select signal is received on line 148 as a 0 which enables NOR 234. If counters 140, 142 and 144 are not being reset, as when the count must change from 359 to zero degrees, then input 234-2 will be at 0 also. Inputs 160-1 and 160-2 of NOR 160 will be at 0 when there are no count pulses on up line 18 and down line 20. Input 234-4 will receive a 0 from inverter 162 therefore. If there is no index signal on lines 26 and 146 so that inputs 154-1 and 154-2 are at 0 to produce a 1 at output 154-3 and the counters are not changing from zero to 359° so that input 176-2 is at 1 then output 176-3 will be at 0 at input 234-3. Therefore, NOR 234 will produce a 1 which enables flip flop 156 to generate a 1 data ready signal on lne 150 in response to a 0 device select signal on line 148 only if counters 140, 142 and 144 are not counting, being corrected, or being reset. This ensures that the count data in counters 140, 142 and 144 is stable so that it may be read from lines 236-1 through 236-4, the binary coded decimal one's digit, lines 238-1 through 238-4, the binary coded decimal ten's digit, and lines 240-1 through 240-4, the binary coded decimal hundred's digit where the binary four line 240-3 and binary eight line 240-4 are grounded through preset inputs 144-13 and 144-14 to provide a 0 signal. Unutilized lines 242 are grounded to provide a 0.

In summary, wind direction counter 22 totals up counts on line 18 and down counts on line 20 from a wind direction detector to convert them to a binary coded decimal indication of wind direction in parallel signal form. Counters 140, 142 and 144 generate the one's, ten's, and hundred's positions of the wind direction in degrees on lines 236, 238 and 240. During counting the total count is automatically reset as wind direction passes from 359 to zero degrees and from zero to 359°. Three index positions are also provided to correct the total count at predetermined points during the wind direction detector rotation. When the wind direction data is to be read, a device select signal received from computing unit 60 on line 148 will generate a data ready signal on line 150 if the counters are not counting, being corrected or being reset.

Figure 3:
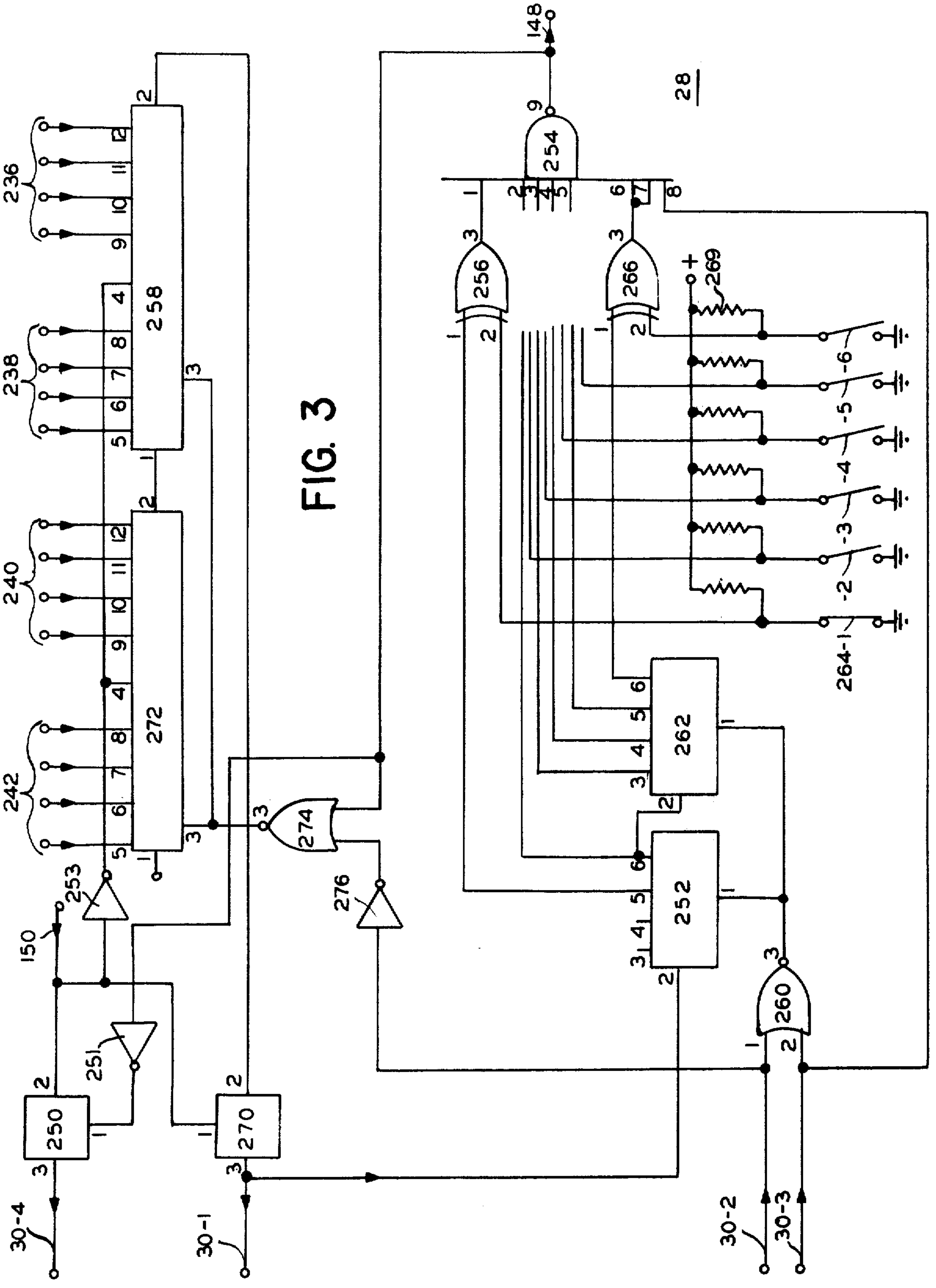
FIG. 3 is a schematic representation of a multiplexer of FIG. 1.

FIG. 3 is a schematic representation of multiplexer 28 of FIG. 1 which is addressed when apparent wind direction data is to be placed onto bus line 30. Multiplexers 40, 52, 100, 120 and 124 have similar circuits. Multiplexer 28 transmits and receives signals on bus line 30 which is comprised of four individual lines, data line 30-1, strobe line 30-2, mode line 30-3 and test line 30-4. When computing unit 60 of FIG. 1 is ready to read the apparent wind direction data the address corresponding to muliplexer 28 is placed on data line 30-1 in multiplexed form with each address bit being accompanied by a strobe signal on line 30-2. Although all multiplexers connected to bus line 30 receive the address and strobe signals, only multiplexer 28 responds to its address. The receipt of the full address and a mode signal on line 30-3 will generate a device select signal on line 148 to wind direction counter 22 of FIG. 1. If the wind direction data is ready, a data ready signal is received on lne 150 to generate a test signal on line 30-4. Computing unit 60, in response to the test signal, sends strobe signals to clock the wind direction data one bit at a time onto data line 30-1 from which it is read.

In FIG. 3, element 250 is a bilateral switch which will pass a 1 or 0 from input 250-2 to output 250-3 without inversion when enable input 250-1 is at 1. When enable input 250-1 is at 0 the element is in an "off" state which represents a high impedance condition which can neither sink nor source current at a definable logic level. Element 252 represents four D-type flip flops connected in series to function as an address shift register. Input 252-1 is the common clock input for the four flip flops. Data is transferred from input 252-2 to output 252-3 when the signal at clock input 252-1 changes from 0 to 1. Each successive clock signal will transfer that bit of input data to the next output and by connecting a second shift register in series with output 252-6 a total of eight bits of data may be entered for storage. Element 254 is an eight input NAND which will produce a 0 at output 254-9 when all inputs are at 1 and a 1 at output 254-9 for any other combination of input signals. Element 256 is an exclusive -or which produces a 0 at output 256-3 if both input signals are the same and a 1 if the input signals are different. Element 258 is a parallel-load eight-bit shift register which shifts data in eight stages from serial input 258-1 to output 258-2. Shifting will occur when clock input 258-3 changes from 0 to 1 while parallel/serial input 258-4 is at 0. Each stage of the shift register may be loaded with data at parallel inputs 258-5 through 258-12 when parallel/serial input 258-4 changes from 0 to 1.

When no multiplexer or demultiplexer is being addressed strobe line 30-2 will receive a 1 and mode line 30-3 will receive a 0 from computing unit 60 of FIG. 1. With one input at 1 NOR 260 will produce a 0 at clock inputs 252-1 and 262-1 of address shift registers 252 and 262. If computing unit 60 is ready for the apparent wind direction data a six bit address is sent in multiplexed form on line 30-1 to shift register input 252-2. During the time each address bit is present on line 30-1 the strobe signal on line 30-2 will be changed from 1 to 0 to produce a 1 at output 260-3 and clock inputs 252-1 and 262-1 to enter the address bit into address shift registers 252 and 262 and then return to 0. After eight strobe signals the address bits will appear at shift register outputs 252-5, 252-6, 262-3, 262-4, 262-5 and 262-6. Switches 264-1 through 264-6 are set to decode the address to provide inputs 254-1 through 254-7 of NAND 254 with a 1 when the correct address is received. If for example, the address bit at output 252-2 is a 1 input 256-2 must receive a 0 to generate a 1 at input 254-1. Therefore, switch 264-1 is closed to ground input 256-2 and provide the required 0. If output 262-6 has a 0 address bit then input 266-2 of exclusive -or 266 must receive a 1 to generate 1 at inputs 254-6 and 254-7. Therefore, switch 264-6 is open and resistor 269 supplies a 1 from a positive power supply. When the correct address is received inputs 254-1 through 254-7 will receive a 1 to enable NAND 254. A maximum of 64 different six bit addresses may be decoded in this manner. The demultiplexers are provided with similar address shift registers so that up to 64 modules connected to bus line 30 by a multiplexer or demultiplexer may be addressed. Additional shift register capacity may be added in series and each additional address bit will increase the number of modules available by a factor of two.

After the address has been received, the mode signal on line 30-3 is changed by computing unit 60 from 0 to 1. This 1 is present at input 260-2 to disable NOR 260 and prevent the production of any clock signals to address shift registers 252 and 262 so that the address remains static to enable NAND 254. The 1 on line 30-3 also is present at input 254-8 of NAND 254 to change output 254-9 to 0 and produce a device select signal on line 148 to apparent wind direction counter 22 of FIG. 2. When the wind direction data is available, line 150 receives a 1 data ready signal. The change from 1 to 0 at output 254-9 produces a 0 which is changed to a 1 by inverter 251 at enable input 250-1 of bilateral switch 250 to place it in an "on" state so that the 1 data ready signal appears on test line 30-4. The 1 on line 150 is also present at enable input 270-1 to enable bilateral switch 270 to pass the output from shift registers 258 and 272. During the time line 150 had been at 0 parallel shift inputs 272-4 and 258-4 received a 1 from inverter 253 to place the shift registers in the parallel mode and the contents of the shift registers changed as the data from counter 22 of FIG. 2 changed on lins 236, 238 and 240. When line 150 changes to 1 the shift registers are changed to the shift mode and the data is latched into the shift registers. In response to the data ready signal on line 30-4, computing unit 60 sends a series of strobe signals on line 30-2 to clock the data from shift registers 272 and 258 onto data line 30-1. The 0 from NAND 254 enables NOR 274 at input 274-2 to produce a 1 clock signal at output 274-3 when input 274-1 changes from 1 to 0. Inverter 276 will produce the required signal change as the strobe signal changes from 0 to 1 on strobe line 30-2. Since parallel shift inputs 272-4 and 258-4 are at 1 to produce the shift mode, each change from 0 to 1 at clock inputs 272-3 and 258-3 from strobe line 30-2 will shift data in registers 272 and 258 to output 258-2 through bilateral switch 270 and onto data line 30-1 one bit at a time. This multiplexed data is read by computing unit 60 and then mode line 30-3 is turned to 0 to disable mutliplexer 28. The data from the shift registers also passes through bilateral switch 270 to input 252-2 of address shift register 252 but the 1 on mode line 30-3 during this time disables NOR 260 so that this data will not be clocked into the address shift register by the strobe signals on line 30-2. The change from 1 to 0 on mode line 30-3 disables NAND 254 and removes the 0 device select signal from line 148 which in turn causes apparent wind direction counter 22 of FIG. 3 to remove the 1 data ready signal from line 150.

Since shift registers 272 and 258 each have an eight bit capacity, up to four binary coded decimal numbers having four bits each may be loaded into them. The wind direction data is received on lines 236, 238 and 240 in the form of three binary coded decimal numbers therefore, inputs 272-5 through 272-8 receive a 0 from wind direction counter 22 of FIG. 2 as lines 242 are connected to ground. Computing unit 60 can be instructed to ignore this one set of data. Where the input data is four binary coded decimal numbers all inputs would be received data and computing unit 60 would utilize all sixteen bits of data.

In summary, shift registers 272 and 258 receive wind direction data on lines 236, 238 and 240 from apparent wind direction counter 22 of FIG. 2. When computing unit 60 of FIG. 1 is ready to read the wind direction data, mutliplexed address signals are sent on data line 30-1 with strobe signals on line 30-2 to be decoded by address shift registers 252 and 262 and NAND 254 to produce a device select signal on line 148. In response to the device select signal, counter 22 of FIG. 2 sends a data ready signal on line 150 to change the mode of shift registers 272 and 258 and latch the wind direction data into them. This data ready signal is transmitted on test line 30-4 to computing unit 60 of FIG. 1 which sends strobe signals on line 30-2 to place the data in shift registers 272 and 258 onto data line 30-1 in multiplexed form.

Figure 4:
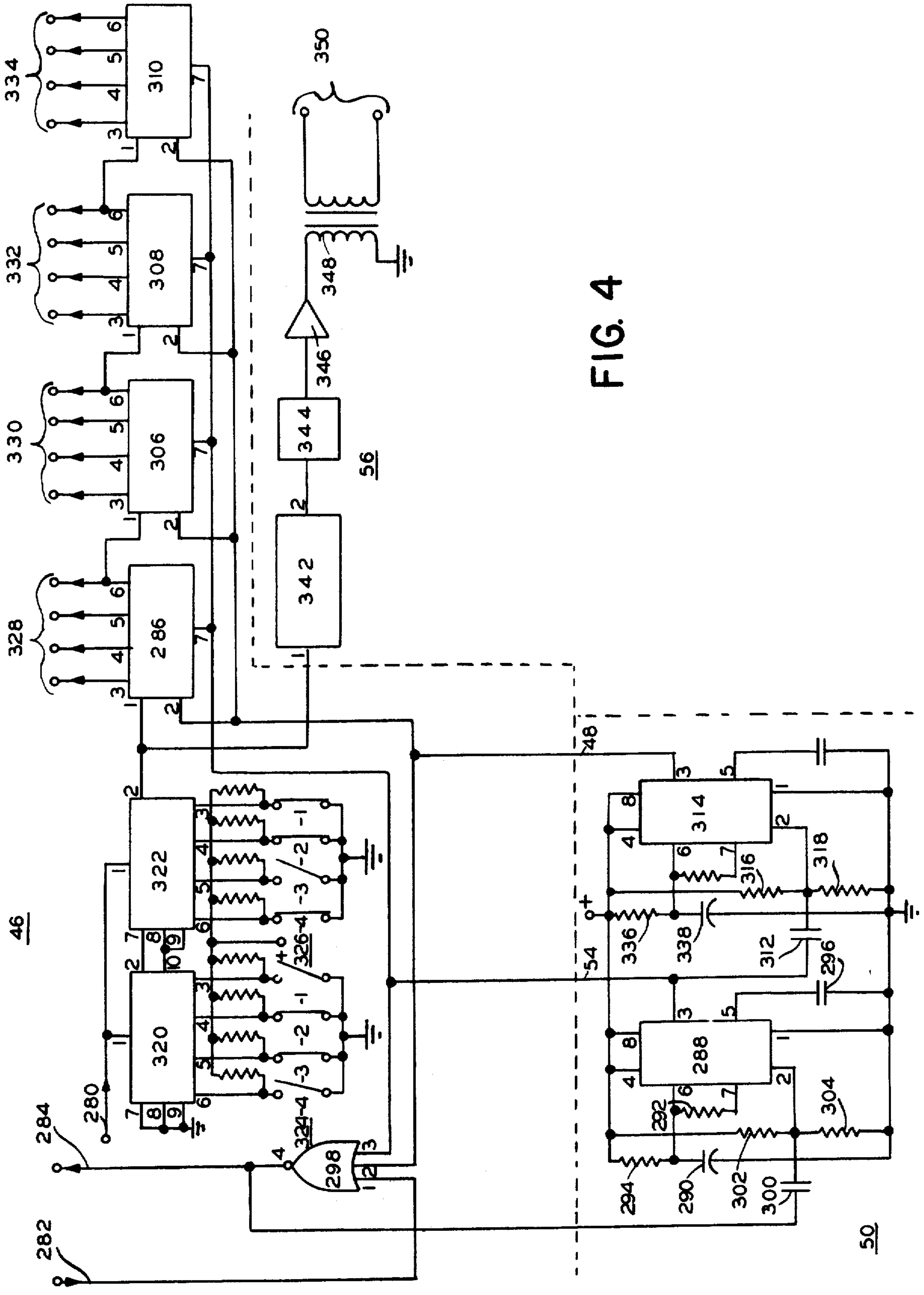
FIG. 4 is a schematic representation of a speed counter and associated timer of FIG. 1.

FIG. 4 is a schematic representation of boat speed counter 46 and timer 50 of FIG. 1. Although the following discussion will be directed toward these elements in particular apparent wind speed counter 34 and timer 38 are similar in design and operation. Also shown is log divider 56 which produces a count of distance traveled. Speed counter 46 receives count signals on input line 280 from boat speed detector 44 of FIG. 1. Timer 50 sends an enable signal on line 48 which enables four binary coded decimal counters to accumulate speed counts for a predetermined period of time. When computing unit 60 is ready to read the boat speed data it will address multiplexer 52 of FIG. 1. Multiplexer 52, which is similar to multiplexer 28 of FIG. 1 except that it is preset to a different address, will generate a device select signal on line 282 and if the count accumulate time has expired a data ready signal will be generated on line 284. In response, multiplexer 52 will transmit the data ready signal on the test line and computing unit 60 will strobe the speed data onto the data line of bus line 30.

Element 286 is a binary coded decimal up counter. When enable input 286-2 receives a 1 pulses appearing at clock input 286-1 will be counted and the total displayed in binary coded decimal form where output 286-3 represents binary one and output 286-6 represents binary eight. A 1 at reset input 286-7 sets all the outputs to 0. Element 288 is a timing circuit externally connected for monostable operation. Capacitor 290 is held discharged by a transistor inside timer 288 connected to discharge input 288-7 through resistor 292. When a 0 is received at trigger input 288-2 output 288-3 is changed from 0 to 1 and capacitor 290 charges from a positive power supply. When the voltage across capacitor 290 reaches a predetermined level at threshold input 288-6 output 288-3 is reset to 0 and the capacitor is discharged. A 0 at reset input 288-4 may be utilized to reset the timing cycle however, input 288-4 is connected to a positive power supply to prevent the possibility of false triggering during monostable operation. Control voltage input 288-5 permits the output pulse time to be varied by the application of different voltage levels but by connecting it to ground through capacitor 296 the timing period is determined solely by the values of capacitor 290 and resistors 292 and 294.

When output 298-4 of NOR 298 changes from 1 to 0 capacitor 300 will produce a short 0 pulse to be applied to trigger input 288-2 of reset timer 288 before the trigger input returns to the voltage level of a positive power supply connected through resistors 302 and 304. Output 288-3 will change from 0 to 1 on reset line 54, as capacitor 290 charges, to generate a 1 reset signal at reset inputs 286-7, 306-7, 308-7 and 310-7 of binary counters 286, 306, 308 and 310 to reset all counter outputs to 0. The values of resistor 294 and capacitor 290 determine a reset timing interval of approximately 10 microseconds. At the end of the reset timing interval output 288-3 will change from 1 to 0 and capacitor 312 will produce a short 0 pulse at trigger input 314-2 of count timer 314 before the trigger input returns to the voltage level of a positive power supply connected through resistors 316 and 318. Output 314-3 will change from 0 to 1 to enable counter 286 at input 286-2 to receive count pulses from input line 280. A 1 count pulse on line 280 is present at clock inputs 320-1 and 322-1 of binary coded decimal rate multipliers 320 and 322. multiplier 320 will produce between zero and ten output pulses at output 320-2 for each ten pulses at clock input 320-1 as determined by the binary coded decimal input number set at inputs 320-3, representing binary one, through 320-6, representing binary eight, when cascade input 320-7, enable input 320-8 and strobe input 320-9 are provided with a 0. Two multipliers may be cascaded, such as 320 and 322, so that multiplier 320 represents the ten's digit and multiplier 322 represents the one's digit of the number of output pulses per one hundred input pulses on line 280. If for example, 94 pulses are desired multiplier 320 would be preset to 90 by closing switch sections 324-2 and 324-3 to provide a 0 from ground while inputs 320-3 and 320-6 receive a 1 from a positive power supply through resistors. Multiplier 322 would be preset to 4 by closing switch sections 326-1, 326-2 and 326-4 to provide a 0 from ground while input 322-5 receives a 1 from a positive power supply through a resistor. During each of the first nine pulses at clock inputs 320-1 and 322-1, output 320-1 will provide a 1 to cascade input 322-7 which will produce a 1 from output 322-2. During the tenth pulse enable output 320-10 will produce a 0 at enable input 322-8 and strobe input 322-9 to enable multiplier 322 to count every tenth pulse and produce a 1 during four of these pulse periods. Therefore, multipliers 320 and 322 will produce 94 pulses at output 322-2 for every 100 pulses on input line 280.

Multipliers 320 and 322 enable the use of the same circuitry for the boat speed counter and the apparent wind speed counter by converting the pulse train frequency of the detectors to a predetermined value for the computing unit and indicators. This adjustment may also be utilized to compensate for differences in output frequency between detectors if the original detector must be replaced. The pulse train from output 322-2 is applied to clock input 286-1 of binary counter 286. When the tenth count pulse is received, the outputs of counter 286 will be changed to 0. Clock input 306-1 of counter 306 is connected to output 286-6 of counter 286 so that when output 286-6 changes from 1 to 0 on every tenth count pulse counter 306 will count one pulse. Counter 308 is in series with counter 306 to count once every one hundred pulses and counter 310 is in series with counter 308 to count once very one thousand pulses. Therefore, the outputs of counter 286 represent the one's place, the outputs of counter 306 represent the ten's place, the outputs of counter 308 represent the hundred's place and the outputs of counter 310 represent the thousand's place of the total number of counts received during the count timing interval in binary coded decimal form. These numbers are available to the shift registers of multiplexer 52 on lines 328, 330, 332 and 334.

Resistor 336 and capacitor 338 determine a count timing interval of approximately 1 second at which time output 314-3 returns to 0 to disable counters 286, 306, 308 and 310 to stop the pulse counting. When computing unit 60 of FIG. 1 is ready to read the apparent wind speed data stored in counters 286, 306, 308 and 310 multiplexer 52 is addressed which generates a 0 device select signal on line 282 at input 298-1 of NOR 298. Only if inputs 298-2 and 298-3 are enabled with a 0 will a 1 data ready signal be generated on line 284. During the reset timing interval input 298-3 of NOR 298 will be at 1 to produce a 0 from output 298-4 on line 284. During the count timing interval input 298-2 will receive a 1 on enable line 48 to produce a 0 from output 298-4 on line 284. Therefore, both timing intervals must be completed to enable NOR 298 to generate a data ready signal on line 284. After the boat speed data has been placed on bus line 30 computing unit 60 causes multiplexer 52 to remove the device select signal from line 282 which changes output 298-4 from 1 to 0 to remove the data ready signal from line 284 and provide the trigger input signal to reset timer 288.

In summary, count timer 314 enables boat speed counter 46 on line 48 to count output pulses from detector 44 of FIG. 1 for a predetermined period of time. These pulses are accumulated in four binary decade counters which convert the total count to four binary coded decimal digits in parallel signal form. Multiplexer 52 of FIG. 1 receives the output from counters 286, 306, 308 and 310 on lines 328, 330, 332 and 334 and places the data on bus line 30 upon being addressed by computing unit 60. When the correct address is received by multiplexer 52, a device select signal is generated on line 282 which in turn will generate a data ready signal on line 284 if the count timing interval has been completed. After the data has been placed on bus line 30, the device select signal is removed from line 282 which then removes the data ready signal from line 284 and triggers reset timer 288 to reset counters 286, 306, 308 and 310 to zero. The end of the reset timing interval triggers count timer 314 to enable the counters for another count timing interval.

Log divider 56 receives the boat speed pulse train from output 322-2 and produces a pulse train proportional to the distance traveled. Element 342 is a twelve-bit binary counter which divides the frequency of the pulse train at input 342-1 by a factor of 1024 at output 342-2. In the preferred embodiment the boat speed pulse train frequency from output 322-2 is 28.44 hertz/knot. Since there are 3600 seconds in an hour, there will be 102,384 pulses per nautical mile at input 342-1 which is converted to 100 pulses per nautical mile at output 342-2 to provide a distance traveled indication of 0.01 nautical mile increments. Element 344 is a monostable multivibrator with a timing interval of 0.1 second to provide a uniform pulse width to amplifier 346 and transformer 348. The pulses are sent on line 350 to distance counter and indicator 58 for visual display.

Figure 5:
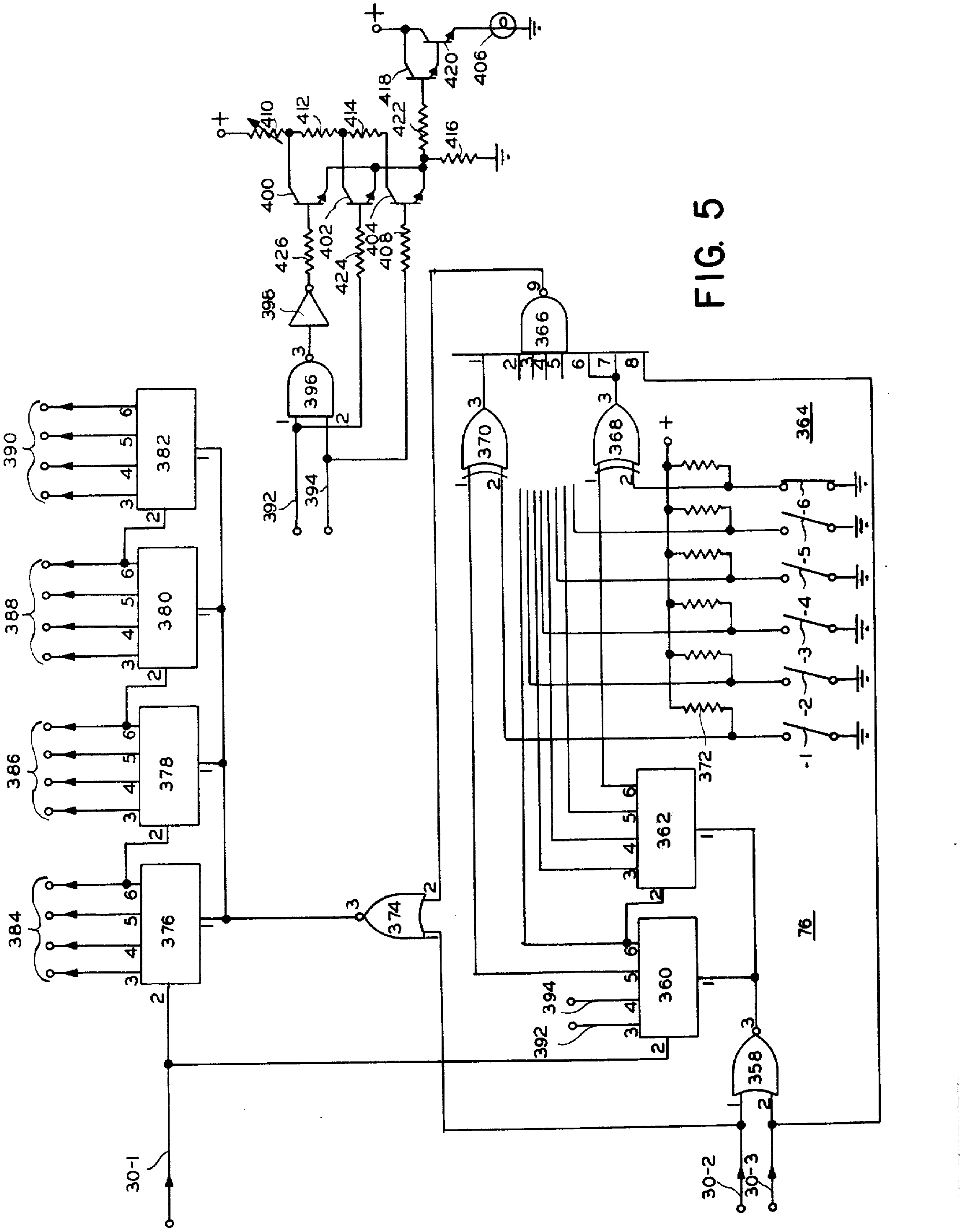
FIG. 5 is a schematic representation of a demultiplexer of FIG. 1.

FIG. 5 is a schematic representation of demultiplexer 76 of FIG. 1 which is addressed by computing unit 60 when the wind direction data is ready for display. Demultiplexers 82, 88 and 126 have similar circuits. Computing unit 60 sends a multiplexed address on data line 30-1 and a strobe signal for each address bit on line 30-2. If the address corresponds to demultiplexer 76 then four shift registers are enabled to receive the display data from line 30-1 as sent by computing unit 60. The data is converted from binary coded decimal form to analog form by converter 78 of FIG. 1 and the analog signal is utilized to drive a visual display 80 such as the pointer on a meter marked in compass degrees.

Before demultiplexer 76 is addressed strobe lne 30-2 is at 1 from computing unit 60. Mode line 30-3 is also at 1 from computing unit 60 and with both inputs of NOR 358 at 1 output 358-3 will be 0 at clock inputs 360-1 and 362-1 of address shift registers 360 and 362. When computing unit 60 sends the eight bit address in multiplexed form on data line 30-1 the signals are received at input 360-2. Each address bit is also accompanied by a strobe signal on line 30-2 in the form of a 0 pulse which changes output 358-3 from 0 to 1 to clock the address bit at input 360-2 onto output 360-3. After the first four address bits have been clocked into shift register 360 the first address bit is available at output 360-6 to input 362-2 of the second shift register 362. After the eighth address bit has been clocked into shift register 360 the first bit is at output 362-6. Switches 364-1 through 364-6 are set to decode the first six address bits by providing inputs 366-1 through 366-7 of NAND 366 with a 1 when the correct address is received. If for example the address bit at output 362-6 is a 1 input 368-2 of exclusive -or must receive a 0 to generate a 1 at inputs 366-6 and 366-7. Therefore, switch 364-6 is closed to ground input 368-2 and provide the required 0. If output 360-5 has a 0 address bit then input 370-2 of exclusive -or 370 must receive a 1 to generate a 1 at input 366-1. Therefore, switch 364-1 is open and resistor 372 supplies a 1 from a positive power supply. When the correct address is received inputs 366-1 through 366-7 will receive a 1 to enable NAND 366. Next, computing unit 60 sends a 1 on mode line 30-3 which is the input at 366-8 to change output 366-9 from 1 to 0 at input 374-2 of NOR 374. This 1 at input 374-2 enables NOR 374 so that when strobe line 30-2 receives a 0 strobe signal at input 374-1 output 374-3 will produce a 1 clock signal to the data shift registers.

Now computing unit 60 sends the wind direction display data in multiplexed form on data line 30-1 to input 376-2 of shift register 376. Each data bit is accompanied by a 0 pulse on strobe line 30-2 which is changed to a 1 by NOR 374 at clock input 376-1 of shift register 376. When strobe line 30-2 changes from 1 to 0 output 374-3 changes from 0 to 1 to clock the data bit at input 376-2 onto output line 376-3. After four bits of data have been clocked into shift register 376 the first data bit which is on output 376-6 is present at input 378-2 of shift register 378 to be clocked onto output 378-3 by the fifth clock pulse. After sixteen strobe signals the first data bit is available at output 382-6 while the last data bit is available at output 376-3. Mode line 30-3 is then returned to 0 to disable NAND 366 and enable NOR 358 to clock the next address received into address shift registers 360 and 362. The display data is available to converter 78 of FIG. 1 on output lines 384, 386, 388 and 390 from shift registers 376, 378, 380 and 382.

The last two address bits which are received and stored at shift register outputs 360-3 and 360-4 are utilized to produce three distinct levels of display lighting intensity. If both bits are 0, lines 392 and 394 will place a 0 at inputs 396-1 and 396-2 of NAND 396 to produce a 1 at output 396-3 which is changed to a 0 by inverter 398. The 0 from inverter 398 and lines 392 and 394 will turn "off" NPN transistors 400, 402 and 404 at the base inputs. Therefore, no current will flow to light lamp 406. If lne 394 receives a 1, current will flow through base resistor 408 to turn "on" transistor 404 which provides a current path from a positive power supply through resistors 410, 412, 414, and 416 to produce a base voltage to NPN transistor 418. Transistors 418 and 420 are connected in what is commonly known as a Darlington configuration which has the advantage of high current gain with high input impedance. With resistors 410, 412, 414 and 416 in series the voltage drop across resistor 416 is relatively small and the base current to transistor 418 through resistor 422 is relatively low to partially turn "on" transistors 418 and 420. Transistor 420 produces a low current flow from a positive power supply through lamp 406 to provide a relatively low light intensity.

If line 392 receives a 1, current will flow through base resistor 424 to turn "on" transistor 402 which provides a current path through resistors 410, 412 and 416. The total resistance of this current path is less than that of the previously discussed state and therefore, the voltage across resistor 416 will be higher to increase the current flow through base resistor 422 to more fully turn "on" transistor 418 and 420. Lamp 406 will be provided with more current from the positive power supply to produce a medium intensity light. In the third state, if both lines 392 and 394 are at 1 NAND 396 will produce a 0 which is changed to a 1 by inverter 398 to produce a current flow through base resistor 426 and turn "On" transistor 400. Transistor 400 provides a current path through resistors 410 and 416 to produce a relatively high voltage across resistor 416. Since transistors 402 and 404 are alos turned "on," the three parallel current paths provide enough current through base resistor 422 to completely turn "on" transistors 418 and 420. Lamp 406 now receives the highest current flow of the three states and will produce the highest light intensity. Resistor 410 is a vaiable resistor to enable an adjustment of the three lighting intensities by controlling the base current to transistor 418 and thereby its degree of turn "On."

In summary, demultiplexer 76 receives a multiplexed eight bit address on data line 30-1 from computing unit 60 of FIG. 1 which is clocked into address shift registers 360 and 362 by strobe signals on line 30-2. NAND 366 and switches 364 decode the addres whereby NAND 366 is enabled only by one of 64 possible address combinations. Next computing unit 60 sends multiplexed data bits on line 30-1 which are clocked into shift registers 376, 378, 380 and 382 by strobe signals on line 30-2. This data is then available as the wind direction information in binary coded decimal form to a maximum of four digits on lines 384, 386, 388 and 390. Converter 78 of FIG. 1 utilizes the data to generate an analog signal to drive wind direction indicator 80.

Figure 6:
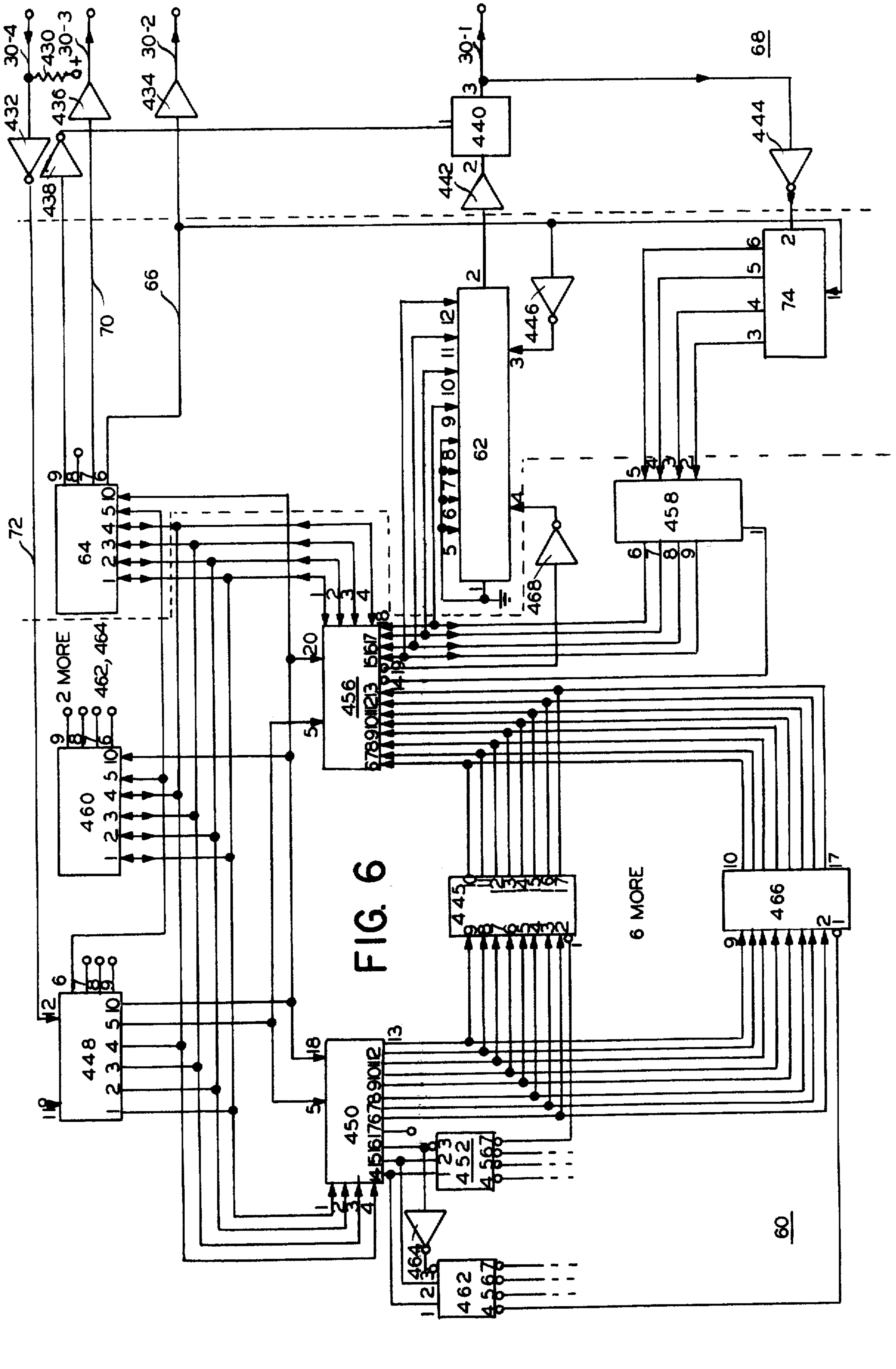
FIG. 6 is a schematic representation of the computing unit, multiplexer, demultiplexer, control and interface circuits of FIG. 1.

FIG. 6 is a schematic representation of computing unit 60, multiplexer 62, control unit 64, interface circuit 68 and demultiplexer 74 of FIG. 1. When data is required computing unit 60 is programmed to provide the correct multiplexer address which is changed from parallel to serial form by multiplexer 62 and is sent out through interface 68 on data line 30-1. In addition, control unit 64 is provided with control signals which generate the strobe and mode signals on lines 30-2 and 30-3. A data ready signal on test line 30-4 indicates the data is available and computing unit 60 sends strobe signals to place the data onto data line 30-1. When the requested data is received at interface 68 it is changed from serial to parallel form by demultiplexer 74 and read by computing unit 60. After the data has been processed, computing unit 60 generates a demultiplexer address which is changed from parallel to serial form by multiplexer 62 and is sent out through interface 68 on data line 30-1 with the strobe and mode signals. Next computing unit 60 sends the data for display through multiplexer 62 and interface 68 to the addressed display device.

Interface 68 connects computing unit 60 with each "data ready" bilateral switch, such as switch 250 of FIG. 3, of multiplexers 28, 40, 52, 100, 120 and 124 of FIG. 1 through test line 30-4. If none of the multiplexers have been addressed, the bilateral switches will be in the "off" state which neither sources nor sinks current. Therefore, line 30-4 will be connected to a positive power supply through resistor 340 to supply a 0 to computing unit 60 through inverter 432.

If the requested data is available when a particular multiplexer is addressed, test line 30-4 will receive a 1 data ready signal from the bilateral switch which has been set to the "on" state. Since line 30-4 was previously supplied with a 1 from resistor 430 which is connected to a positive power supply computing unit 60 will continue to receive a 0 on line 72 from inverter 432 to indicate the data is available. In response, computing unit 60 will signal control unit 64 to send the correct number of strobe signals on line 30-2 to enable the addressed multiplexer to place the data onto data line 30-1. If the data is not available when the bilateral switch is set to the "on" state a 0 will appear on line 30-4. Inverter 432 will change the signal on line 72 from 0 to 1 to indicate that the data is not ready. Computing unit 60 may be programmed to wait for the data ready signal or to jump over the portion of the program requiring the data to the next instruction so that the data is not obtained until the program returns to the omitted portion.

Control unit 64 sends strobe signals on line 66 through amplifier 434 onto line 30-2 and mode signals on line 70 through amplifier 436 onto line 30-3. When address data or display data is to be sent out on line 30-1 control unit 64 provides a 0 which is changed to a 1 by inverter 438 to enable input 440-1 of bilateral switch 440 to enable switch 440 to pass multiplexed data from multiplexer 62 through amplifier 442 onto line 30-1. Data which is received on line 30-1 is blocked by bilateral switch 440 but is inverted by inverter 444 before entering demultiplexer 74. Amplifiers 434, 436 and 442 are provided to ensure the proper signal levels to the various inputs.

Demultiplexer 74 is a four-bit shift register similar to address shift register 252 of FIG. 3. Input data at input 74-2 is clocked onto output 74-3 when clock input 74-1 changes from 0 to 1 as supplied by control 64 as it strobes the data from a multiplexer onto data line 30-1. After four clock pulses, the first bit of data will have been shifted to output 74-6. When computing unit 60 is ready to send or receive data a first four-bit address is placed onto inputs 62-9 through 62-12 of multiplexer 62 which is an eight-bit shift register similar to shift register 258 of FIG. 3. When parallel/serial input 62-4 changes from 0 to 1 this data is loaded into the shift register along with a 0 at inputs 62-5 through 62-8 from ground. Input 62-4 is changed back to 0 and each time control 64 changes the strobe signal from 1 to 0 the signal at clock input 62-3 will be changed from 0 to 1 by inverter 446 to shift the data to output 62-2 and data line 30-1. After four clock pulses multiplexer 62 will contain all 0 signals since serial input 62-1 is grounded. Now a second four-bit address is placed at inputs 62-9 through 62-12 and the procedure is repeated to complete the transmission of the eight-bit address. In a similar manner four-bit groups of display data are sent on data line 30-1 to the various demultiplexers.

Computing unit 60 is typically a special purpose, programmable microcomputer comprised of elements such as those manufactured by the Intel Corporation, 3065 Bowers Avenue, Santa Clara, Calif. 95051. A central processing unit performs the control and data processing functions as directed by program instructions stored in read only memories upon data stored in random access memories. Communication between the elements is accomplished over a four-line data bus. Central processing unit (CPU) 448 includes an internal address register which stores the address of the instructions during the running of the program. CPU 448 begins at the first instruction address in the program which usually corresponds to the first memory location in the first read only memory. This memory location contains the first instruction to be executed by CPU 448. After each instruction is completed, the address in the address register is incremented and this new address is utilized to obtain the next program instruction.

CPU 448 is connected to the four-line data bus by input/output terminals 448-1 through 448-4 whereby data and addresses may be sent and data and instructions may be received. CPU 448 may also enable a group of read only memories from output 448-5 or enable up to four random access memories from each of outputs 448-6 through 448-9. A sync signal is produced at the start of each instruction cycle from output 448-10 to coordinate the operation of the various elements comprising computing unit 60. A reset signal may be applied at inpput 448-11 to enable CPU 448 to start at the address for the first instruction. Test input 448-12 receives the data ready signal from the various multiplexers.

Element 64 is a random access memory (RAM) which performs two functions. It stores 320 bits of information in four registers of twenty, four-bit characters each. Up to four RAMS's may be grouped together to be enabled from one output such as 448-6 of CPU 448. An enable signal at input 64-5 will enable the four memories and an address on data bus input/outputs 64-1, 64-2, 64-3 and 64-4 will select the proper memory, register number and character mumber. CPU 448 may read data or an instruction or store data in the selected character location. RAM 64 functions as a communication device with elements outside computing unit 60. Instructions may be stored which will cause CPU 448 to transfer data which is placed on outputs 64-6, 64-7, 64-8 and 64-9 to control other devices. Input 64-10 receives the sync signal from output 448-10 at the beginning of each instruction cycle.

Element 450 is an address latch which latches the address received at inputs 450-1 through 450-4 from CPU 448 when enabled by a control signal at input 450-5. The address is presented in three groups of four bits each as eight bits of program address at outputs 450-6 through 450-13 and four bits of memory number at outputs 450-14 through 450-17. Three bits of the memory number are decoded to select a particular read only memory and the program address selects one word in the selected memory. Input 450-18 receives the sync signal from output 448-10 at the beginning of each instruction cycle.

Element 452 is a one out of four binary decoder which receives a binary memory number at address inputs 452-1, 452-2 and 452-3 and decodes it to place a select signal at one of four outputs 452-4 through 452-7. Element 445 is a read only memory (ROM) with a storage capacity of 256 eight-bit words. Each ROM utilized is preprogrammed with instructions in the order in which they will be addressed. A slect signal at input 445-1 enables the memory and an eight-bit program address at address inputs 445-2 through 445-9 selects one of the 256 eight-bit words for display on output lines 445-10 through 445-17.

Element 456 is an instruction and input/output transfer device. When enabled by a control signal at input 456-5 eight-bit words received at inputs 456-6 through 456-13 are transferred four bits at a time from input/outputs 456-1, 456-2, 456-3 and 456-4 to the data bus and CPU 448. Upon instruction from CPU 448 transfer 456 will generate an input strobe signal at 456-14 to transfer data at input/output ports 456-15, 456-16,

456-17 and 456-18 to input/outputs 456-1, 456-2, 456-3 and 456-4 respectively or generate an output strobe signal at 456-19 to transfer data at input/outputs 456-1 through 456-4 to input/output ports 456-15 through 456-18. Input 456-20 receives the sync signal from output 448-10 at the beginning of each instruction cycle. Element 458 is a strobed hex inverter buffer which is in the "on" state when control input 458-1 is at 0 and will pass signals from inputs 458-2, 458-3, 458-4 and 458-5 to outputs 458-6, 458-7, 458-8 and 458-9 respectively. If control input 458-1 is at 1 buffer 458 is in the "off" state and will neither sink nor source current at a definable logic level at outputs 458-6 through 458-9.

The elements of computing unit 60 operate on a 10.8 microsecond instruction cycle comprised of eight subcycles of approximately 1.35 microseconds duration each. At the beginning of the instruction cycle CPU 448 generates a sync signal from output 448-10 to address latch 450, transfer device 456 and RAM's 64 and 46. In addition CPU 448 and all elements receiving the sync signal also receive two non-overlapping clock signals (inputs not shown) which determine the period of the subcycles. In a typical instruction cycle, CPU 448 will send an address in three groups of four bits each, one group in each of the first three subcycles. The address is generated at input/output terminals 448-1 through 448-4 and placed on the data bus where it is received at inputs 450-1 through 450-4 of address latch 450. In addition, a control signal is sent from output 448-5 to input 450-5 to enable address latch 450 to latch the first eight bits as the program address on outputs 450-6 through 450-13 and the last four bits as the memory on outputs 450-14 through 450-17. Since eight ROM's are utilized, only two bits of memory number and an enable signal are required to select the proper memory. Binary decoders 452 and 462 decode the memory number at inputs 452-1, 452-2, 462-1 and 462-2 to select an output such outputs 462-4 and 462-7 for example. The signal at output 450-16 determines which decoder is enabled, a 0 enabling decoder 452 at enable input 452-3 and a 1 being changed to a 0 by inverter 464 to enable decoder 462 at enable input 462-3. If decoder 452 is enabled a 0 is generated at output 452-7 to enable ROM 445 at enable input 445-1. The eight-bit program address at address inputs 445-2 through 445-9 selects one of the 256 eight bit instruction words stored in memory 445 which is produced at outputs 445-10 through 445-17 during the fourth subcycle. Transfer device 456 receives the instruction word at inputs 456-6 through 456-13 and generates the word, four bits during each of the fourth and fifth subcycles, at input/outputs 456-1 through 456-4 on the data bus where the instruction word is read by CPU 448. During the final three subcycles CPU 448 executes the instruction by operating on some data or sending or receiving an address or data on the data bus.

A ROM such as memory 466 may also be utilized to store data concerning the boat's previous best performance characteristics. An instruction stored in one of the ROM's would direct 448 to address the memory locations in ROM 466 and the data would be sent to CPU 448 through transfer device 456. Suitable program instuctions would then permit the calculation of the boat's present deviation from the best previous performance to generate a display of how well the boat was being sailed. With such data the sailor could make minor corrections in an attempt to increase the present performance and would be able to see the immediate effect of such corrections.

If the instruction received by CPU 448 from a ROM is a "send register control" instruction the RAM's and address latch 450 will receive address bits during the seventh and eighth subcyles of the instruction cycle. Address latch 450 and decoders 452 and 462 select the proper ROM location for an input/output instruction which is executed during the next instruction cycle. If data is to be sent out during execution of the input/output instruction, CPU 448 places the data, such as a multiplexer address, on the four-line data bus at input/outputs 456-1 through 456-4 where it is transferred to input/output ports 456-15 through 456-18. A 0 output strobe signal is produced at 456-19 and inverted by inverter 468 to enable multiplexer 62 at parallel/serial input 62-4 to load the data from transfer device 456 onto inputs 62-9 through 62-12. Then output 456-19 changes to 1 which produces a 0 at 62-4 to enable multiplexer 62 to shift the data onto data line 30-1. The next instruction will direct RAM 64 to generate an enable signal from output 64-9 to bilateral switch 440 and strobe signals from output 64-6 to amplifier 434 and clock input 62-3 to place the data onto data line 30-1. This is the process by which multiplexer and demultiplexer addresses and display data is transmitted from computing unit 60. If the data is to be read in during execution of the input/output instruction, CPU 448 will direct RAM 64 to generate strobe signals from output 64-6 to amplifier 434 and clock input 74-1 to place the data received on data line 30-1 onto demultiplexer outputs 74-3 through 74-6. Then CPU 448 instructs transfer device 456 to generate a 0 input strobe signal from 456-14 to control input 458-1 of buffer 458 to place the data at outputs 74-3 through 74-6 at input/output ports 456-15 through 456-18. This data is transferred to input/outputs 456-1 through 456-4 where it is read by CPU 448. Data on line 30-1 is inverted once by inverter 444 and then inverted again by buffer 458 to its original form.

In summary, computing unit 60 includes CPU 448 which performs control and data processing functions as directed by program instructions stored in ROM's upon data stored in RAM's. CPU 448 generates addresses which are decoded by address latch 450 and decoders 452 and 462 to select a memory location in a ROM such as ROM 445. When such a memory location is selected the contents of the memory location are transmitted through transfer device 456 to CPU 448. If the memory location contains a program instruction, CPU 448 executes the instruction by processing data or sending control signals. All the aforementioned steps are performed during an instruction cycle initiated by a sync signal from CPU 448. Data and multiplexer and demultiplexer addresses are sent by CPU 448 through transfer device 456 and multiplexer 62 to data line 30-1. Multiplexer 62 is enabled by an output strobe signal from 456-19 of transfer device 456 to place the data or address on inputs 62-9 through 62-12. Then CPU 448 sends control signals to RAM 64 which generates as enable signal to bilateral switch 440 and strobe signals to clock the data or address onto data line 30-1. After an address has been sent, CPU 448 will direct RAM 64 to send a mode signal on line 30-3 which enables the addressed multiplexer or demultiplexer. If a multiplexer has been addressed, a data ready signal will be received on test line 30-4 to indicate that the requested data is available. CPU 448 will direct RAM 64 to send strobe signals through amplifier 434 on line 30-2 to cause the addressed multiplexer to place the data onto data line 30-1. Demultiplexer 74 receives this data which is clocked onto outputs 74-3 through 74-6 by the strobe signals. Then CPU 448 will direct transfer device 456 to enable buffer 458 and the data will appear at input/outputs 456-1 through 456-4 to be read by CPU 448.

Although the present invention has been disclosed in terrms of a modular system for evaluating sailboat performance from variables including boat speed, apparent wind speed and apparent wind direction the system may be used to evaluate any type of input signal which is capable of being reduced to binary coded decimal form. The number of modular detection and signal display units is limited only by the number of addresses available and the capacity of the computing unit.

Figure 7:
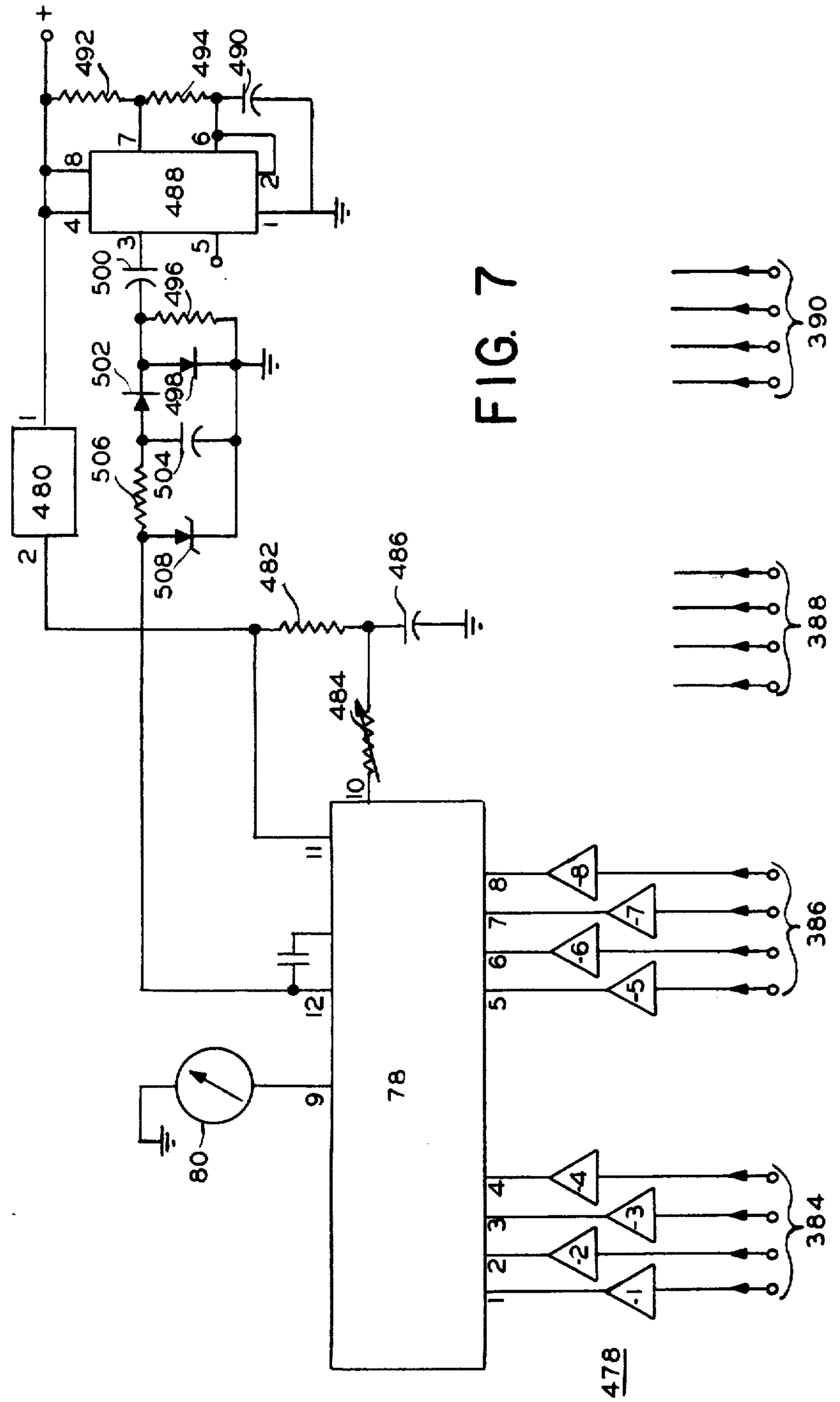
FIG. 7 is a schematic representation of the digital-to-analog converter and analog indicator for wind speed of FIG. 1.

FIG. 7 is a schematic representation of digital-to-analog converter 78 and analog indicator 80 of FIG. 1. A binary coded output signal is received from demultiplexer 76 in parallel form and is converted to an analog signal to drive an indicator such as a meter to display wind direction in compass degrees. Demultiplexer 76 of FIG. 5 provides eight bits of data on lines 384 and 386. These data bits pass through buffer amplifiers 478-1 through 478-8 which provide a constant input signal to data inputs 78-1 through 78-8. The output current from output 78-9 is a linear product of the value of the eight bit input word and an external reference voltage. That is, as each data bit is added to increase the digital value of the input word the output current level is changed by 1/256 of its maximum value. Since a negative output current is provided the positive terminal of meter 80 is connected to ground and current will flow meter 80 to output terminal 78-9 with no current flow for a word comprised of a 0 at each input and maximum current flow for a word comprised of a 1 at each input.

The reference voltage which determines the value for each output current step is supplied at reference input 78-10. Voltage regulator 480 is connected to a positive power supply at input 480-1 and supplies for example, a positive five volts direct current reference signal at output 480-2. Resistors 482 and 484 and the input impedance of the reference input act as a voltage divider to determine the input voltage to input 78-10. Resistor 484 is a variable resistor which is utilized to adjust the input reference voltage to the desired value. Capacitor 486 smooths out any ripple present on the output from voltage regulator 480 which could cause an error in the output current value. A positive supply voltage equal to the output from voltage regulator 480 is required at input 78-11 and a negative supply voltage is required at input 78-12 for the operation of converter 78. Timing unit 488, similar to timing unit 288 of FIG. 4, is connected for astable operation to trigger itself and free run as a multivibrator producing a train of alternating 0 and 1 pulses. Capacitor 490 charges from a positive power supply through resistors 492 and 494 during which time output 488-3 is at 1. When capacitor 490 reaches a predetermined voltage level at threshold input 488-6 output 488-3 is set to 0 and capacitor 490 discharges through resistor 494 into discharge input 488-7. When capacitor 490 has discharged to a trigger voltage at trigger input 488-2 output 488-3 is reset to 1 and capacitor 490 is allowed to recharge.

Each time output 488-3 changes from 0 to 1 a positive voltage pulse will appear across resistor 496 with a maximum value limited by the forward voltage drop of diode 498. As capacitor 500 charges to the voltage level of the 1 signal, the voltage across resistor will diminish to zero. When output 488-3 changes from 1 to 0 a negative voltage pulse will appear across resistor 496 but diode 502 passes current to charge capacitor 504 to the level of the negative voltage pulse. If the frequency of the pulse train from timing unit 488 is relatively high, capacitor 504 will remain charged between 1 to 0 transitions and will provide a negative supply voltage to input 78-2 with current limited by series resistor 506 and voltage held to an accurate predetermined level by zener diode 508.

In summary, digital-to-analog converter 78 receives an eight-bit binary word from demultiplexer 76 on lines 384 and 386 and converts it to an output current which is a linear function of the word value and a reference voltage. The output current is supplied to a meter which indicates the wind direction in compass degrees.

Figures 8, 9:
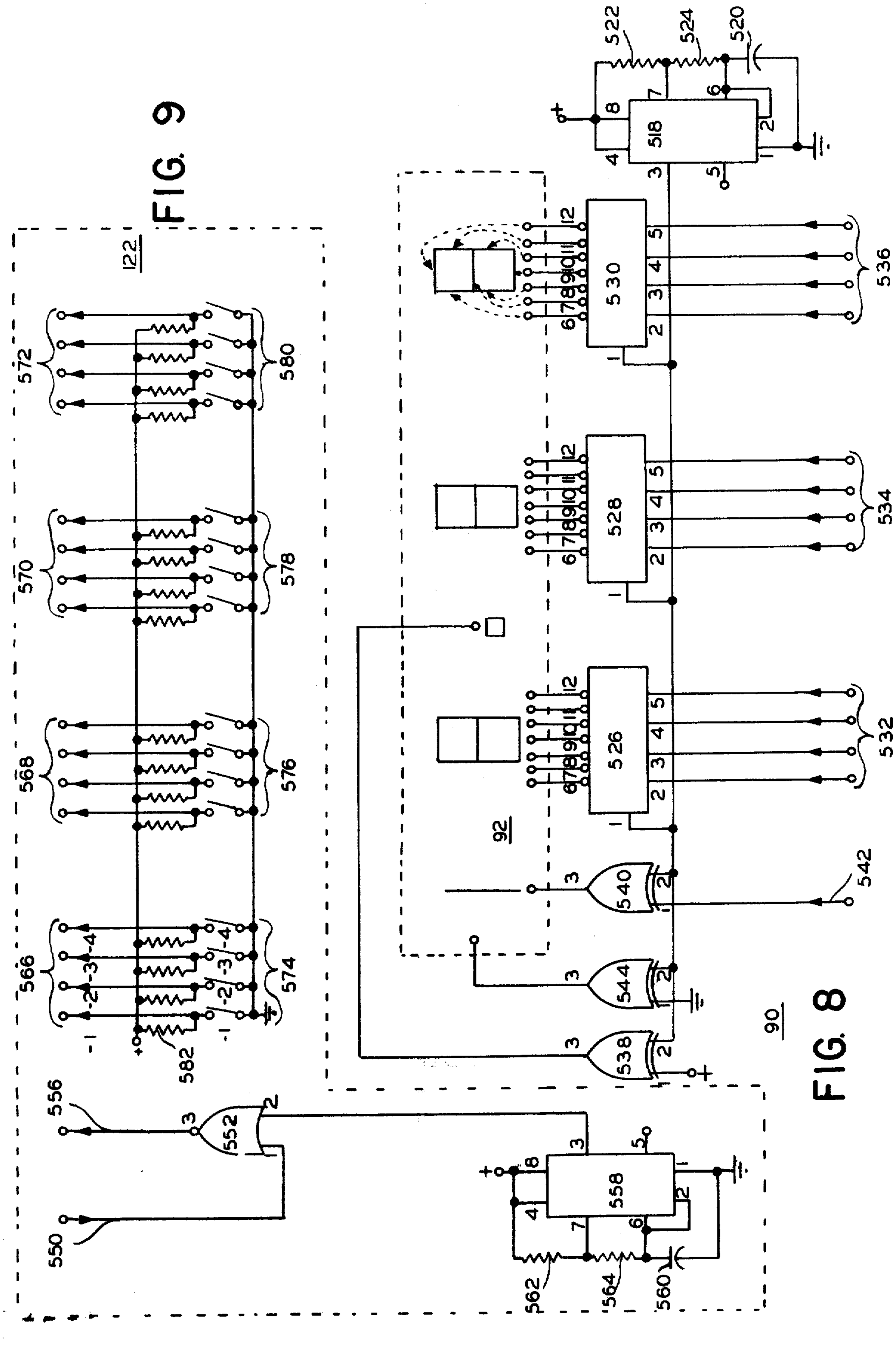
FIG. 8 is a schematic representation of the digital indicators of FIG. 1.
FIG. 9 is a schematic representation of the control switches and timer of FIG. 1.

FIG. 8 is a schematic representation of a digital display such as wind speed indicator 86, boat speed indicator 92 and position indicator 130 of FIG. 1. Three groups of binary coded decimal numbers are decoded and displayed as decimal numbers indicating the value of the parameter being measured. In the preferred embodiment the digital displays 86, 92 and 130 may be liquid crystal display devices requiring alternating current drive voltages for extended life operation. This drive voltage is generated by a free-running timer which produces a square wave for the decoders.

Timing unit 518, similar to timing unit 488 of FIG. 7, is connected for astable operation to produce a train of alternating 0 and 1 pulses to drive the signal decoders. Capacitor 520 charges from a positive power supply through resistors 522 and 524 producing a 1 at output 518-3. When capacitor 520 reaches a predetermined voltage level at threshold input 518-6 output 518-3 is set to 0 and capacitor 520 discharges through resistor 524 into discharge input 518-7. When the voltage across capacitor 520 has fallen to a predetermined trigger voltage level at trigger input 518-2 output 518-3 is reset to 1 and capacitor 520 is allowed to recharge. The frequency of the pulse train is determined by the values of resistors 522 and 524 and capacitor 520.

If, for example, FIG. 8 represents display decoder 90 and boat speed indicator 92 of FIG. 1, element 526 is a binary coded decimal to seven segment decoder/driver which decodes a four-bit binary coded decimal boat speed number at inputs 526-2 through 526-5 to enable those outputs 526-6 through 526-12 which will drive the segments of indicator 92 to produce the corresponding decimal number in the units position. Indicator 92 may be a liquid crystal display which has seven segments of liquid crystal material confined between two sheets of glass. Each segment is normally transparent but upon the application of an electric field becomes turbulent and scatters light to appear as an optically dense area.

Decoder/drivers 526, 528 and 530 receive the three groups of boat speed data from demultiplexer 88 of FIG. 1 on input lines 532, 534 and 536 and are provided with a square wave drive signal at display frequency inputs 526-1, 528-1 and 530-1 from timing unit output 518-3. If the least significant digit is to be four the signals on lines 536 at inputs 530-2 through 530-5 will be 0010. The corresponding outputs 530-6 through 530-12 will provide the signals 1100110 to enable the correct display segments with a 1 when the display backplane is driven to a 0 state by exclusive -or 544 and will provide the signals 0011001 when the display backplane is driven to a 1 state as the square wave alternates between 0 and 1 thereby providing the alternating current voltage for each display segment and producing a decimal four visual output.

Exclusive -or element 538 drives the decimal point in the indicator between the most significant digit and the next most significant digit. Input 538-1 is provided with a 1 from a positive power supply so that when iput 538-2 is at 0 from timing unit output 518-3 is at 1 and when input 538-2 is at 1 output 538-3 is at 0 thereby providing an alternating current drive voltage for the decimal point in phase with the display numbers, Similarly, exclusive -or 540 provides the capability of driving an overrange digit "one" for expanding the boat speed from a maximum of 9.99 knots to a maximum of 19.99 knots which is sufficient for most sailing boats. If input line 542 is provided with a 0 from demultiplexer 88, input 540-1 will be at 0 and output 540-3 will provide a square wave output signal in phase with the backplane drive signal from exclusive -or 544 so that the "one" is not energized when the other digits are being energized. If input line 542 is provided with a 1 then exclusive -or 540 will provide a square wave in phase with the decimal point and the decimal digits so that the "one" is energized as the ten's digit.

Exclusive -or 544 has input 544-1 grounded so that output 544-3 produces a square wave which is the complement of the timing unit output to drive the display backplane with an alternating current voltage for extended life operation. The backplane of display 92 is energized when the decimal number is not energized and blank to provide a background the decimal number is energized.

In summary, boat speed digital indicator 92 is supplied with decoded signals for driving a visual display of boat speed in decimal number form for a period of time and at successive intervals as determined by timing unit 518 in astable operation. Binary coded decimal to seven segment decoder/drivers 526, 528 and 530 decode three groups of binary coded decimal boat speed data received from demultiplexer 88 for a maximum speed indication of 9.99 knots. Exclusive -or's 538, 540 and 544 control the decimal point, a ten's place indicator to expand to a maximum of 19.99 knots and the indicator background lighting. Digital indicators 86 and 130 operate in a similar manner but may have the capability to display larger numbers.

FIG. 9 is a schematic representation of control switches and timer 122 of FIG. 1. The control switches are utilized to enter fixed data or program control signals into computing unit 60 while the timer provides an external time reference to the computer program. Before multiplexer 124 of FIG. 1 receives its assigned address device select line 550 is at 1 at input 552-1 of NOR 552 to produce a 0 at output 552-3 to indicate the absence of a data ready signal on line 556. When multiplexer 124 receives its assigned address a device select signal is generated on line 550 to produce a 0 at input 552-1 to enable NOR 552. Timing unit 558, similar to timing unit 518 of FIG. 8, is connected for astable operation to produce a train of alternating 0 and 1 pulses to generate a data ready signal on line 556. Capacitor 560 charges from a positive power suply through resistors 562 and 564 producing a 1 at output 558-3 to input 552-2 of NOR 552. If input 552-1 is enabled with a 0 output 552-3 will be a 0 to indicate the absence of a data ready signal on line 556.

When capacitor 560 reaches a predetermined voltage level at threshold input 558-6 output 558-3 is set to 0 and capacitor 560 discharges through resistor 564 into discharge input 558-7. The change from 1 to 0 at output 558-3 produces a 1 data ready signal from output 552-3 on line 556 to signify that a fixed time interval has elapsed and that multiplexer 124 may read the data from output lines 566, 568, 570 and 572. When the voltage across capacitor 560 has fallen to a predetermined trigger voltage level at trigger input 558-2 output 558-3 is reset to 1 and capacitor 560 is allowed to recharge. The change to 1 at output 558-3 removes the data ready signal from line 556. The frequency of the pulse train and the length of time NOR 552 produces the data ready signal are determined by the values of resistors 562 and 564 and capacitor 560.

Normally, when there is no data transmission between computing unit 60 and the multiplexers or demultiplexers, control switches and timer 122 will be addressed through multiplexer 124 to enable the computer program to respond to the timing signal from timer 558. The computer program would contain instructions to address multiplexer 124 and to read the signal on data ready line 556.

Control switches 574, 576, 578 and 580 each have four switch sections which may be manually set to produce a data bit on one of the output lines. For example, output line 566-1 is provided with a 1 signal from a positive power supply through resistor 582 and may be grounded through switch section 574-1 which provides a 0. The four groups of four-bit words may represent a value for a new averaging period for boat speed, apparent wind speed or apparent wind direction and may also include the two data bits for the display lighting utilized in demultiplexer 76 of FIG. 5. Computing unit 60 reads the new data and substitutes it for the data which had been stored in computer memory as the standard averaging periods and lighting level. Also, as was previously discussed, where the system employs autopilot or dead reckoning capabilities the control switches may be utilized to generate a desired compass heading to be inserted into the computer program.

In summary, the present invention is a modular system directed toward evaluating sailboat performance but capable of receiving, processing and displaying data of any type. Input data is gathered by detectors and converted from parallel to serial binary coded decimal form by multiplexers. Output data is received by demultiplexers which convert it from serial to parallel form to be decoded and displayed on indicators. A computing unit processes the input data according to a stored program which also generates the output data. The multiplexers, demultiplexers and computing unit are separate modules connected by a common bus line over which the computing unit can communicate with any multiplexer or demultiplexer by transmitting a unique six-bit address code. Data is transmitted on the bus line as four words of four-bit coded decimal information. The basic system is designed to sense and display wind direction, wind speed and boat speed and may be expanded to include such functions as dead reckoning and autopiloting.

In accordance with the provisions of the patent statutes, we have explained the principle and mode of operation of our invention and have illustrated and described what we now consider to represent its best embodiment. However, we desire to have it understood that the invention may be practiced otherwise than as specifically illustrated and described without departing from its spirit and scope.

What we claim is:

1. A system for evaluating sailboat performance comprising:

a signal source representing a variable having an effect upon sailboat performance;

counting means connected to said source for producing a binary coded decimal input signal in parallel form representing said variable;

multiplexing means connected to said counting means and responsive to a first address signal for converting said binary coded decimal input a signal from parallel to serial form;

computing means for generating said first address signal and responsive to said binary coded decimal input signal for generating an output signal representing a sailboat performance characteristic; and bus means connecting said multiplexing means and said computing means.

2. A system according to claim 1 wherein said computing means generates said output signal as a binary coded decimal output signal in serial form and a second address signal in response to said binary coded decimal input signal.

3. A system according to claim 2 including demultiplexing means connected to said bus means and responsive to said second address signal for converting said binary coded decimal output signal from serial to parallel form and means connected to said demultiplexing means responsive to said binary coded decimal output signal in parallel form for determining sailboat performance characteristics.

4. A system according to claim 3 wherein said means for determining sailboat performance characteristics includes a visual indicator.

5. A system for evaluating sailboat performance comprising:

a signal source representing apparent wind direction;

counting means response to said apparent wind direction signal source for producing a first binary coded decimal input signal in parallel form representing apparent wind direction;

multiplexing means connected to said apparent wind direction counting means and responsive to a first address signal for converting said first binary coded decimal input signal from parallel to serial form;

a signal source representing apparent wind speed;

counting means responsive to said apparent wind speed signal source for producing a second binary coded decimal input signal in parallel form representing apparent wind speed;

multiplexing means connected to said apparent wind speed counting means and responsive to a second address signal for converting said second binary coded decimal input signal from parallel to serial form;

a signal source representing boat speed;

counting means responsive to said boat speed signal source for producing a third binary coded decimal input signal in parallel form representing boat speed;

multiplexing means connectd to said boat speed counting means and responsive to a third address signal for converting said third binary coded decimal input signal from parallel to serial form;

computing means for generating said first, second and third address signals and responsive to said first, second and third input signals for generating at least one output signal representing a sailboat performance characteristic; and bus means connecting said multiplexing means and said computing means.

6. A system according to claim 5 wherein said signal source representing apparent wind direction includes wind direction detection means responsive to the apparent wind, encoding means responsive to the position of said detection means for generating a position signal, and decoding means responsive to said position signal for generating signals representing the direction of rotation of said detection means for said apparent wind direction signal.

7. A system according to claim 6 wherein said wind direction detection means is a conventional wind vane.

8. A system according to claim 6 wherein said encoding means produces said position signal in analog form in response to the position of said detection means.

9. A system according to claim 8 wherein said decoding means produces said signals as a first pulse train representing clockwise rotation of said detection means and a second pulse train representing counterclockwise rotation of said detection means in response to said analog position signal.

10. A system according to claim 9 wherein said encoding means produces an index signal at predetermined positions of said detection means.

11. A system according to claim 10 wherein said decoding means produces index pulses to said index signal.

12. A system according to claim 11 wherein said counting means for producing a first input signal includes at least one up/down binary coded decimal counter responsive to said first pulse train for counting upward and responsive to said second pulse train for counting downward for producing a first binary coded decimal input signal in parallel form representing an accumulated total of pulses from said decoding means.

13. A system according to claim 12 wherein said counting means for producing a first input signal includes means responsive to said index pulses for generating predetermined count totals and wherein said counters are responsive to said predetermined count totals for generating said first binary coded decimal input signal in parallel form.

14. A system according to claim 12 wherein said counting means for producing a first input signal includes means for resetting said counters when counting through zero degrees in the upward or downward direction.

15. A system according to claim 6 wherein said encoding means is a dual-track quadrature phased incremental shaft encoder.

16. A system according to claim 5 wherein said multiplexing means connected to said apparent wind direction counting means generates a device select signal in response to said first address signal and wherein said counting means for producing a first input signal includes means for producing a data ready signal in response to said device select signal.

17. A system according to claim 16 wherein said means for producing a data ready signal includes a NOR flip flop which is set to a first output state in response to said device select signal and is reset to a second output state when said counters are counting, being set to predetermined count totals or being reset.

18. A system according to claim 5 wherein said signal source representing apparent wind speed includes a wind speed detector responsive to the apparent wind for producing a pulse train with a frequency proportional to apparent wind speed for said apparent wind speed signal.

19. A system according to claim 18 wherein said wind speed detector is a masthead anemometer.

20. A system according to claim 18 wherein said counting means for producing a second input signal includes at least one binary coded decimal counter responsive to said pulse train for producing a second binary coded decimal input signal in parallel form representing an accumulated total of pulses from said wind speed detector.

21. A system according to claim 20 wherein said multiplexing means connected to said apparent wind speed counting means generates a device select signal in response to said second address signal and wherein said counting means for producing a second input signal includes means for generating a data ready signal in response to the presence of said device select signal and the absence of a reset signal and an enabling, a reset timer for generating said reset signal for a first predetermined time interval in response to the termination of said data ready signal, and a count timer for generating an enabling signal for a second predetermined time interval in response to the termination of said reset signal and wherein said counters reset to zero in response to said reset signal and count said pulse train in response to said enabling signal.

22. A system according to claim 20 wherein said counting means for producing a second input signal includes frequency conversion means connected between said wind speed detector and said counters for multiplying the frequency of said pulse train by a predetermined conversion factor.

23. A system according to claim 5 wherein said signal source representing boat speed includes a boat speed detector responsive to the movement of the boat for producing a pulse train with a frequency proportional to boat speed for said boat speed signal.

24. A system according to claim 23 wherein said boat speed detector is a magnetic paddlewheel.

25. A system according to claim 5 wherein each of said multiplexing means includes addressing means responsive to a predetermined one of said address signals from said computing means for generating a device select signal to a corresponding one of said counting means.

26. A system according to claim 25 wherein said address signals are in binary coded decimal form, said computing means generates a strobe signal for each bit of said predetermined address signal, said addressing means includes at least one shift register which stores each bit of said predetermined address signal in response to said strobe signal from said computing means, and said addressing means includes decoding means for generating said device select signal in response to said address bits stored in said shift register.

27. A system according to claim 26 wherein said computing means generates a mode signal and said decoding means is enabled by said mode signal from said computing means.

28. A system according to claim 25 wherein said corresponding counting means includes means for generating a data ready signal in response to the presence of said device select signal; each of said multiplexing means includes data conversion means for converting one of said binary coded decimal input signals from parallel to serial form; said computing means generates a strobe signal for each bit of said one input signal; and wherein said data conversion means includes at least one shift register responsive to said one input signal, said strobe signal, said device select signal, and said data ready signal for generating said one input signal one bit at a time at an output.

29. A system according to claim 28 wherein said multiplexing means includes a bilateral switch connecting said shift register output to said bus means.

30. A system according to claim 29 wherein each of said multiplexing means includes a bilateral switch connecting an output from said corresponding counting means for said data ready signal to said bus means.

31. A system according to claim 5 wherein said computing means includes memory means for storing program instructions and a central processing unit for processing said input signals and generating said address signals, enable signals, and said output signals in response to said program instruction.

32. A system according to claim 31 wherein said computing means includes an address latch connectd to said central processing unit for generating a program address signal and a memory number signal in response to said address signals and said enable signals from said central processing unit; decoding means for producing a select signal in response to said memory number signal, wherein said memory means for storing program instructions generates a predetermined one of a plurality of stored program instruction signals in response to said program address signal and said select signal; and an instruction and input/output transfer device for transferring said program instruction signals from said memory storage means to said central processing unit.

33. A system according to claim 32 wherein said memory storage means includes at least one read only memory element for generating said predetermined one of said plurality of stored program instruction signals in response to said program address signal and said select signals.

34. A system according to claim 31 wherein said computing means include a control unit connected to said central processing unit for producing strobe signals, mode signals and switch enable signals in response to said address and enable signals from said central processing unit.

35. A system according to claim 34 wherein said control unit is a random access memory.

36. A system according to claim 34 wherein said computing means includes an instruction and input/output transfer device connected to said central processing unit for transferring said input signals, said address signals, and said output signals; address and data multiplexing means connected to said transfer device;

data demultiplexing means connected to said transfer device; and an interface circuit connecting said central processing unit, said address and data multiplexing means, said data demultiplexing means, and said control unit to said bus means.

37. A system according to claim 36 wherein said address and data multiplexing means is a shift register responsive to said strobe signal.

38. A system according to claim 36 wherein said data demultiplexing means is a shift register responsive to said strobe signal.

39. A system according to claim 36 wherein said interface circuit includes a first bilateral switch responsive to said control unit switch enable signal for connecting said address and data multiplexing means to said bus means.

40. A system according to claim 5 wherein said bus means includes a strobe signal line, a mode signal line, a test signal line and an address and data signal line connecting said computing means to said multiplexers.

41. A system according to claim 5 wherein said computing means generates a first binary coded decimal output signal in serial form representing a sailboat performance characteristic and a fourth address signal in response to one of said input signals.

42. A system according to claim 41 including demultiplexing means connected to said bus means and responsive to said fourth address signal for converting said first output signal from serial to parallel form, means responsive to said first output signal in parallel form for producing an analog signal and means responsive to said analog signal for producing said output signal representing a sailboat performance characteristic.

43. A system according to claim 42 wherein said demultiplexing means includes addressing means responsive to said fourth address signal from said computing means.

44. A system according to claim 43 wherein said addressing means includes at least one shift register which stores each bit of said fourth address signal in response to a strobe signal from said computing means.

45. A system according to claim 43 wherein said addressing means includes a decoding means for generating a clock signal in response to said fourth address signal at said shift register outputs.

46. A system according to claim 45 wherein said decoding means is enabled by a mode signal from said computing means.

47. A system according to claim 42 wherein said demultiplexing means includes data conversion means having at least one shift register connected to said bus means for receiving said first output a signal one bit at a time in response to a strobe signal from said computing means and generating said first output signal in parallel form at said shift register outputs.

48. A system according to claim 42 wherein said means for producing an analog signal is a digital to analog converter.

49. A system according to claim 48 wherein said means responsive to said analog signal is a visual indicator.

50. A system according to claim 4 including demultiplexing means connected to said bus means and responsive to said fourth address signal for converting said first output signal from serial to parallel form and means responsive to said first output signal in parallel form for producing said output signal representing a sailboat performance characteristic.

51. A system according to claim 50 wherein said means responsive to said first output signal in parallel form includes a visual indicator.

52. A system according to claim 51 wherein said visual indicator includes a display decoder.

53. A system according to claim 52 wherein said display decoder is a binary coded decimal to seven segment decoder element.

54. A system according to claim 51 wherein said visual display includes a lighted decimal display device.

55. A system according to claim 5 including a signal source representing wave effect, counting means responsive to said source for producing a fourth binary coded decimal input signal in parallel form representing wave effect and multiplexing means connected between said conversion means and said bus means and responsive to a fifth address signal from said computing means for converting said fourth input signal from parallel to serial form.

56. A system according to claim 55 wherein said signal source representing wave effect includes an accelerometer for generating an analog signal.

57. A system according to claim 55 wherein said counting means is an analog to digital converter responsive to said analog signal for producing said fourth binary coded decimal input signal in parallel form.

58. A system according to claim 5 including a signal source representing compass direction, counting means responsive to said source for producing a fifth binary coded decimal input signal in parallel form representing compass direction and multiplexing means connected between said conversion means and said bus means and responsive to an sixth address signal from said computing means for converting said fifth input signal from parallel to serial form.

59. A system according to claim 58 wherein said computing means generates a first binary coded decimal output signal in serial form representing boat position for said output signal representing a sailboat performance characteristic and a seventh address signal in response to said fifth input signal; and including demultiplexing means connected to said bus means and responsive to said seventh address signal for converting said output signal from serial to parallel form and means responsive to said first output signal in parallel form for producing said output signal representing boat position.

60. A system according to claim 5 including control switch means for producing a sixth binary coded decimal input signal in parallel form representing control data signals and multiplexing means connected between said control switch means and said bus means and responsive to a eight address signal for converting said sixth input signal from parallel to serial form.

61. A system according to claim 60 wherein said control switch means includes a plurality of signal outputs each connected to a positive power supply through a resistor and to ground through a switch.

* * * * *